(12) United States Patent
Miyazawa et al.

(10) Patent No.: US 9,055,193 B2
(45) Date of Patent: Jun. 9, 2015

(54) SYSTEM AND METHOD OF A REMOTE CONFERENCE

(71) Applicants: Jun Miyazawa, Chiryu (JP); Tomohiro Inagaki, Nagoya (JP)

(72) Inventors: Jun Miyazawa, Chiryu (JP); Tomohiro Inagaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 68 days.

(21) Appl. No.: 13/780,371

(22) Filed: Feb. 28, 2013

(65) Prior Publication Data

US 2013/0222526 A1    Aug. 29, 2013

(30) Foreign Application Priority Data

Feb. 29, 2012  (JP) ................................. 2012-043606
Sep. 28, 2012  (JP) ................................. 2012-216997

(51) Int. Cl.
  *H04N 7/14* (2006.01)
  *H04N 7/15* (2006.01)
  *H04M 3/56* (2006.01)
  *H04L 12/18* (2006.01)

(52) U.S. Cl.
  CPC ............... *H04N 7/155* (2013.01); *H04M 3/567* (2013.01); *H04L 12/1818* (2013.01)

(58) Field of Classification Search
  CPC ......... H04N 7/15; H04N 7/147; H04N 7/152; H04N 7/141
  USPC ................................ 348/14.01, 14.08, 14.09
  See application file for complete search history.

(56) References Cited

U.S. PATENT DOCUMENTS

| | | | |
|---|---|---|---|
| 2012/0274731 A1* | 11/2012 | Shanmukhadas et al. | 348/14.08 |
| 2014/0192142 A1* | 7/2014 | Goyal et al. | 348/14.08 |

FOREIGN PATENT DOCUMENTS

JP    2003134487 A    5/2003

* cited by examiner

*Primary Examiner* — Quoc D Tran
(74) *Attorney, Agent, or Firm* — Banner & Witcoff, Ltd.

(57) ABSTRACT

A system may include a first communication device, and a recording server. The first communication device may set layout information indicative of a layout of media data. The first communication device may transmit, to the recording server, first media data to be transmitted to the second communication device, the layout information, and first identification information identifying the first communication device. The recording server may store the first media data, the layout information, and the first identification information transmitted from the first communication device. The recording server may receive a request for conference proceedings data from a particular device. The recording server may determine particular layout information for the particular device. The recording server may generate conference proceedings data based on the determined layout information and media data requested by the particular device.

23 Claims, 20 Drawing Sheets

| Conference identification information | Specified date and time | Attribute information | Layout information | |
|---|---|---|---|---|
| ID_A | 2012/1/1 12:00 | A | Layout U1 | ~50A |
| | 2012/1/1 12:00 | B | Layout U2 | ~50B |
| | 2012/1/1 12:00 | C | Layout U3 | ~50C |
| | 2012/1/1 12:00 | D | Layout U4 | ~50D |
| | . | . | . | |
| | – | Decision-making conference | Layout T1 | ~50E |
| | – | Liaison conference | Layout T2 | ~50F |
| | – | Seminar | Layout T3 | ~50G |
| | – | Presentation | Layout T4 | ~50H |
| | . | . | . | |

| Conference identification information | Acquired data and time | Device identification information | Media data | |
|---|---|---|---|---|
| ID_A | 2012/1/1 12:00 | A | userA.mov | ~40A |
| | 2012/1/1 12:00 | B | userB.mov | ~40B |
| | 2012/1/1 12:00 | C | userC.mov | ~40C |
| | 2012/1/1 12:00 | D | userD.mov | ~40D |
| | 2012/1/1 12:00 | A | Book1.doc | ~40E |
| | ⋮ | ⋮ | ⋮ | |

Fig.4A

| Conference identification information | Specified date and time | Attribute information | Layout information | |
|---|---|---|---|---|
| ID_A | 2012/1/1 12:00 | A | Layout U1 | ~50A |
| | 2012/1/1 12:00 | B | Layout U2 | ~50B |
| | 2012/1/1 12:00 | C | Layout U3 | ~50C |
| | 2012/1/1 12:00 | D | Layout U4 | ~50D |
| | ... | ... | ... | |
| | − | Decision-making conference | Layout T1 | ~50E |
| | − | Liaison conference | Layout T2 | ~50F |
| | − | Seminar | Layout T3 | ~50G |
| | − | Presentation | Layout T4 | ~50H |
| | ... | ... | ... | |

| Conference identification information | Device identificatin information | Authority information |
|---|---|---|
| ID_A | A | TRUE |
| | B | FALSE |
| | C | FALSE |
| | D | FALSE |

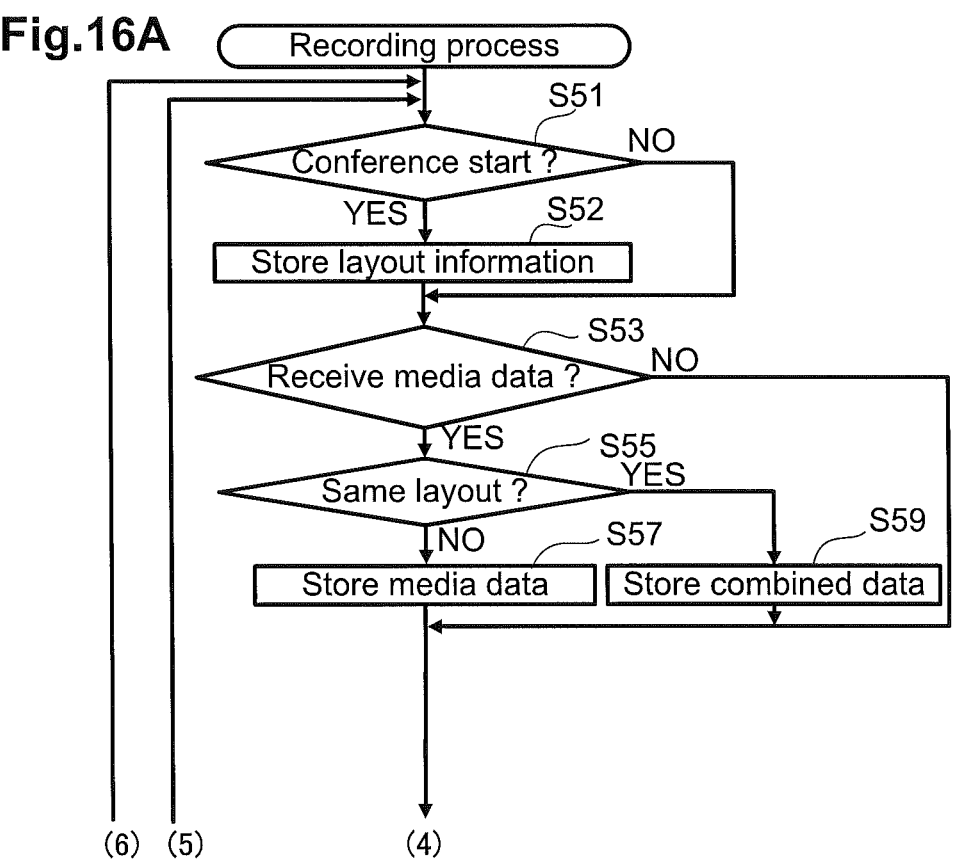

SYSTEM AND METHOD OF A REMOTE CONFERENCE

CROSS-REFERENCE TO RELATED APPLICATION

This application claims priority from Japanese Patent Application No. 2012-043606, filed on Feb. 29, 2012, and Japanese Patent Application No. 2012-216997, filed on Sep. 28, 2012, which are each incorporated herein by reference.

TECHNICAL FIELD

Aspects of the disclosure relate to a conference system, a conference proceedings server, and a conference proceedings generating method that are configured to record a remote conference held among a plurality of communication devices via a network.

BACKGROUND

A conference system for holding a remote conference is known. In the known conference system, communication devices configured to input and output image data and audio data of users of the communication devices are installed at respective different locations. The image data and audio data of the users who are present at the respective different locations are transmitted and received among the communication devices via a network. The received image and audio data are combined in each communication device and then outputted from each communication device. In such a conference system, when a conference is over, a communication device may transmit data related to the conference to a server configured to store the data.

SUMMARY

In the known technique, the server is configured to transmit conference proceedings data to a communication device that requests the conference proceedings data. However, in the known technique, the server may not generate the conference proceedings data after determining an appropriate layout in accordance with identification information of the communication device that requests the conference proceedings data.

Aspects of the disclosure provide for a system and a method that are configured to provide conference proceedings data having a layout suitable for attribute information of a communication device that requests the conference proceedings data.

Aspects described herein may provide a system that may comprise a recording server; and a first communication device configured to communicate with the recording server. The first communication device may comprise a first processor and a first memory storing first computer-readable instructions therein that, when executed by the first processor, cause the first communication device to receive first media data including at least one of first image data and first audio data from a first image acquiring device and a first audio acquiring device, respectively; receive second media data including at least one of second image data and second audio data from a second communication device communicating with the first communication device in a conference via a network; select layout information for controlling a layout of the second image data on a display connected to the first communication device; and transmit, to the recording server, the first media data, the layout information, and identification information identifying the first communication device. The recording server may comprises a data storage configured to store data, a second processor, and a second memory. The second memory storing second computer-readable instructions therein that, when executed by the second processor, cause the recording server to receive the first media data from the first communication device; receive the second media data from the second communication device; store, in the data storage, the first media data in association with conference identification information and the first device identification information identifying the first communication device; store, in the data storage, the second media data in association with the conference identification information and second device identification information identifying the second communication device; receive a conference proceedings request; select a specified layout based on information included within the conference proceedings request; and generate conference proceedings data by formatting the first and second media data according to the specified layout.

According to other aspects computer-executable instructions of a communication device may be provided. The computer-executable instructions may cause the communication device to receive first media data including at least one of first image data and first audio data from a first image acquiring device and a first audio acquiring device, respectively; receive second media data including at least one of second image data and second audio data from a second communication device communicating with the first communication device in a conference via a network; select layout information for controlling a layout of the second image data on a display connected to the first communication device; and transmit, to a recording server, the first media data, the layout information, and identification information identifying the first communication device.

According to still other aspects computer-executable instructions of a server may be provided. These computer-executable instructions may cause the server to receive first media data including at least one of first image data and first audio data from a first communication device; receive second media data including at least one of second image data and second audio data from a second communication device; store, in the data storage area, the first media data in association with conference identification information and first device identification information identifying the first communication device; store, in the data storage area, the second media data in association with the conference identification information and second device identification information identifying the second communication device; receive a conference proceedings request; select a specific layout based on information included within the conference proceedings request; and generate conference proceedings data by formatting the first and second media data according to the specific layout.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawing.

FIG. 3 is a diagram depicting an example structure of data included in a media data list in the first illustrative embodiment according to one or more aspects of the disclosure.

FIG. 4A is a diagram depicting an example structure of data included a layout information list in the first illustrative embodiment according to one or more aspects of the disclosure.

FIG. 4B is a conceptual diagram depicting a list in which conference identification information, device identification information, and authority information are stored in association with each other in the first illustrative embodiment according to one or more aspects of the disclosure.

FIGS. 16A and 16B illustrate a flowchart depicting an example recording process in the second illustrative embodiment according to one or more aspects of the disclosure.

DETAILED DESCRIPTION OF EMBODIMENTS

Figure 1:
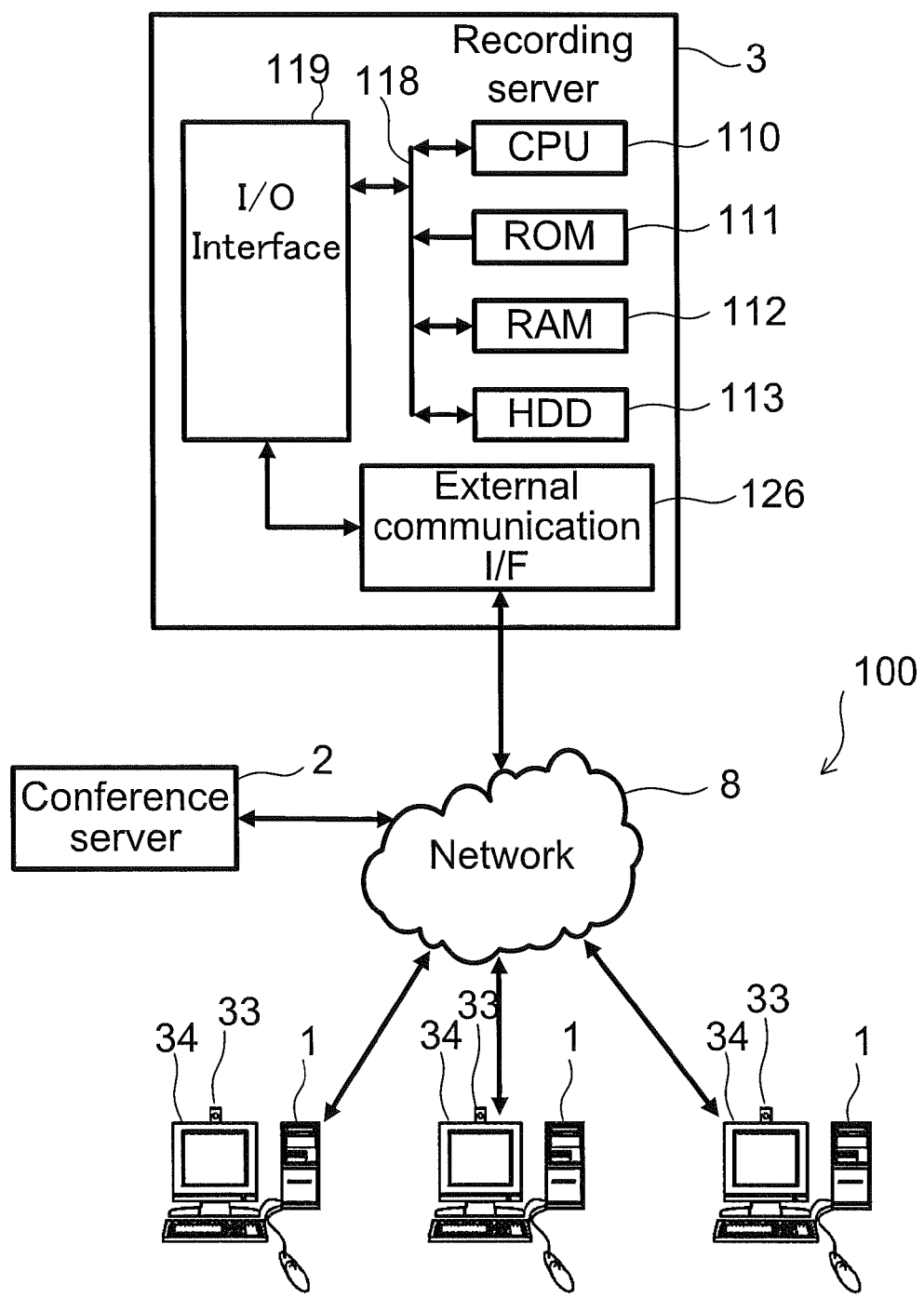
FIG. 1 depicts a configuration of a conference system in a first illustrative embodiment according to one or more aspects of the disclosure.

Hereinafter, a first illustrative embodiment will be described in detail with reference to the accompanying drawings. The drawings will be referred to in order to explain technical features that may be adopted by the aspects of the disclosure. Configurations of devices and flowcharts of various processes depicted in the drawings do not limit the aspects of the disclosure but merely illustrate the aspects of the disclosure.

With reference to FIG. 1, a configuration of a conference system 100 will be described. The conference system 100 comprises a plurality of communication devices 1, a conference server 2, and a recording server 3. Each communication device 1 is configured to transmit and receive various data and instructions to and from the conference server 2 and the recording server 3 via a network 8, for example, the Internet. The conference server 2 is configured to control a remote conference (e.g., a television ("TV") conference) held among the plurality of communication devices 1. The remote conference includes, for example, audio and image data communications performed among the communication devices 1. The recording server 3 is configured to record various data used during a remote conference held among the communication devices 1 and generate conference proceedings data of the remote conference. The conference proceedings data may be a record of the contents of a remote conference held among a plurality of communication devices.

Figure 2:
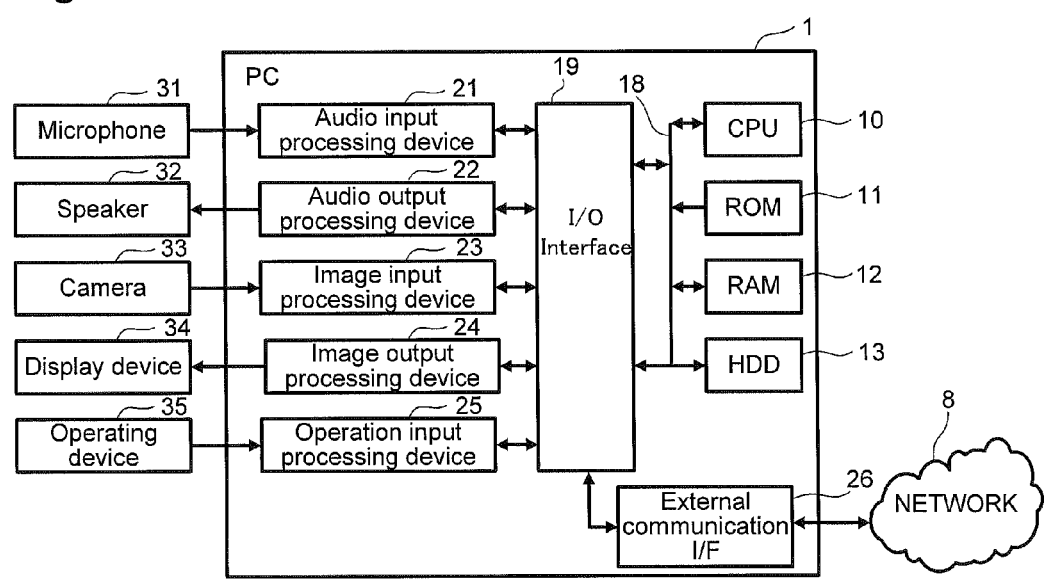
FIG. 2 is a block diagram depicting an example electrical configuration of a communication device in the first illustrative embodiment according to one or more aspects of the disclosure.

As depicted in FIG. 1, a camera 33 and a display device 34 are configured to be connected to each communication device 1. As depicted in FIG. 2, a microphone 31 may be configured to be connected to each communication device 1. Each communication device 1 is configured to transmit one or more of image data captured with the camera 33, audio data collected through the microphone 31 (see FIG. 2), and material data, to the conference server 2 during a remote conference. The material data comprises, for example, documents or moving images referred to during a remote conference. Hereinafter, the data of the record of the contents of the remote conference may be referred to as "media data". More specifically, the image data, the audio data, and the material data acquired in each communication device 1 may be collectively referred to as the "media data".

The conference server 2 may be configured to receive media data from each communication device 1 and transmit each received media data to the communication devices 1 that are different from a sender of the media data. For example, when a remote conference is held among four terminals A, B, C, D, the conference server 2 may receive media data from each terminal A-D. Then, the conference server 2 may transmit the media data received from, for example, the terminal A, to the other three terminals B-D. In the same manner, the conference server 2 transmits the received media data to the terminals A-D, respectively. Hereinafter, the communication devices 1 are also referred to as the "terminals A-D", respectively. Each communication device 1 may be configured to generate and output conference data based on the one or more pieces of media data received from the conference server 2. The conference data comprises one or more pieces of image data, including material data, arranged by using a predetermined layout.

Each communication device 1 is configured to output the conference data by displaying image data transmitted from one or more other communication devices 1 connected to the remote conference on the display device 34 of each communication device 1 and outputting audio data transmitted from the one or more other communication devices 1 through a speaker 32 (see FIG. 2) of each communication device 1. As a result, the image data and the audio data acquired by the plurality of communication devices 1 are shared in the conference system 100. With this conference system 100, a remote conference may proceed smoothly among all members who are present at respective different locations by using the plurality of communication devices 1. This remote conference control may be similar to a known remote conference control, and therefore, detailed description of this control will be omitted in the first illustrative embodiment.

Each communication device 1 may be configured to also transmit, to the recording server 3, the media data that is the same as the media data transmitted to the conference server 2. Each communication device 1 may further be configured to transmit layout information specified in each communication device 1 to the recording server 3. The recording server 3 may be configured to store the media data and the layout information received from each communication device 1 in a hard disk drive ("HDD") 113 or other data storage and generate conference proceedings data based on the stored media data and layout information. Therefore, a user of each communication device 1 may be allowed to view a playback of the recorded remote conference held in the past by playing the conference proceedings data generated in the recording server 3 in each communication device 1.

With reference to FIG. 2, an electrical configuration of each communication device 1 will be described. The plurality of communication devices 1 may have the same configuration. Therefore, the following description will be made with reference to one of the communication devices 1. In the first illustrative embodiment, the communication device 1 may be a general-purpose personal computer. The communication device 1 comprises a central processing unit ("CPU") 10, a read-only memory ("ROM") 11, a random-access memory ("RAM") 12, an HDD 13, and an input/output ("I/O") interface 19. The CPU 10, the ROM 11, the RAM 12, and the HDD 13, and the I/O interface 19 are connected with each other via a bus 18. The ROM 11 is configured to store various programs, for example, a basic input output system ("BIOS"), for operating the communication device 1, and various initial setting values. The RAM 12 is configured to temporarily store various information to be used by a control program.

The HDD 13 may be a nonvolatile storage device and may be configured to store a program for allowing the CPU 10 to perform a remote conference. The program may comprise one or more programs for allowing the CPU 10 to perform a conferencing process (see FIG. 3) and a terminal-side conference-proceedings reproducing process (see FIG. 10). The program may be stored in the HDD 13 via a recording medium, for example, a compact-disc read-only memory ("CD-ROM"). In some instances, the program may be stored in a predetermined server. In this case, the program may be downloaded from the server and stored in the HDD 13 via the network 8.

An audio input processing device 21, an audio output processing device 22, an image input processing device 23, an image output processing device 24, an operation input processing device 25, and an external communication interface ("I/F") 26 may be connected to the I/O interface 19. The microphone 31 may be configured to be connected to the audio input processing device 21. The audio input processing device 21 may be configured to process audio data inputted from the microphone 31 that acquires audio. The speaker 32 may be configured to be connected to the audio output processing device 22. The audio output processing device 22 may be configured to process operations of the speaker 32. The camera 33 may be configured to be connected to the image input processing device 23. The image input processing device 23 may be configured to process image data inputted from the camera 33 that captures an image. The display device 34 may be configured to be connected to the image output processing device 24. The image output processing device 24 may be configured to process operations of the display device 34 that displays an image. The operation input processing device 25 may be configured to process operations inputted from an operating device 35, for example, a keyboard, mouse, etc. The external communication I/F 26 may be configured to allow the communication device 1 to connect to the network 8. The audio input processing device 21, the audio output processing device 22, the image input processing device 23, the image output processing device 24, and the operation input processing device may be controlled by an operating system (OS) installed in the communication device 1.

With reference to FIG. 1, an electrical configuration of the recording server 3 will be described. In the first illustrative embodiment, the recording server 3 may be a general-purpose server. The recording server 3 may comprise a CPU 110, a ROM 111, a RAM 112, the HDD 113, and an I/O interface 119. The CPU 110, the ROM 111, the RAM 112, the HDD 113, and the I/O interface 119 may be connected with each other via a bus 118. An external communication I/F 126 may be connected to the I/O interface 119. The external communication I/F 126 may be configured to allow the recording server 3 to connect to the network 8.

The HDD 113 may be configured to store the media data (see FIG. 3) and the layout information (see FIG. 4A) received from each communication device 1. The media data and the layout information will be described in detail later. The HDD 113 may also be configured to store one or more programs for allowing the CPU 110 to perform a recording process (see FIG. 6) and a server-side conference-proceedings generating process (see FIG. 11). The recording server 3 is further configured to perform a time measuring operation by using functions of an operating system installed on the recording server 3. With the performance of the time measuring operation, the recording server 3 is allowed to determine the current date and time.

The conference server 2 may be a general-purpose server and may have the same electrical configuration as the recording server 3. Accordingly, detailed description of the conference server 2 will be omitted. The conference server 2 is configured to store, in an HDD or other computer-readable storage medium thereof, a server-side conference program for allowing a CPU of the conference server 2 to perform the remote conference control. Herein, a computer-readable storage medium may be a non-transitory computer-readable storage medium, which excludes a transitory signal, but which may include any other storage medium regardless of a time period that the storage medium stores data.

With reference to FIG. 3, a media data list 40 to be stored in the recording server 3 will be described. As described above, the media data is transmitted from each communication device 1 and received by the recording server 3. For example, media data 40A, 40B, 40C, 40D, 40E may be transmitted from the communication devices 1 and acquired by the recording server 3. The acquired media data 40A-40E may then be stored, as the media data list 40, in the HDD 113 of the recording server 3, as depicted in FIG. 3. More specifically, for example, the media data 40A, an acquired date and time, and a specific device identification ("ID") assigned to the communication device 1 that transmitted the media data 40A, may be stored in the HDD 113 in association with each other. The other media data 40B-E may also be stored in the HDD in the same manner. The acquired date and time represents the date and time when the recording server 3 received the media data or stored the received media data in the HDD 113.

With reference to FIGS. 4A and 4B, a layout information list 50 to be stored in the recording server 3 will be described. As described above, the layout information may also be transmitted from each communication device 1 and acquired by the recording server 3. For example, layout information 50A, 50B, 50C, 50D may be transmitted from the respective communication devices 1 and acquired by the recording server 3. The acquired layout information 50A-50D may then be stored as the layout information list 50, on a device-by-device basis, in the HDD 113 of the recording server 3, as depicted in FIG. 4A. The layout information 50A-50D may be template format information representing a layout of image data. For example, layout information 50A-50D may include an identifier indicating the type of template used to lay out image data. Each layout information 50A-50D may be associated with a specified date and time and attribute information. The specified date and time may represent the date and time when the layout information is specified in the communication device 1. For example, the specified date and time may identify a date and time when a layout is selected. The attribute information may represent information related to a user who uses the layout information. More specifically, the attribute information may represent, for example, a terminal ID (e.g., a user name provided to the conference application or a user name stored by the OS running the conference application). In some cases, the attribute information may represent a type or purpose of the remote conference (hereinafter, collectively referred to as a "conference type").

Figure 5:
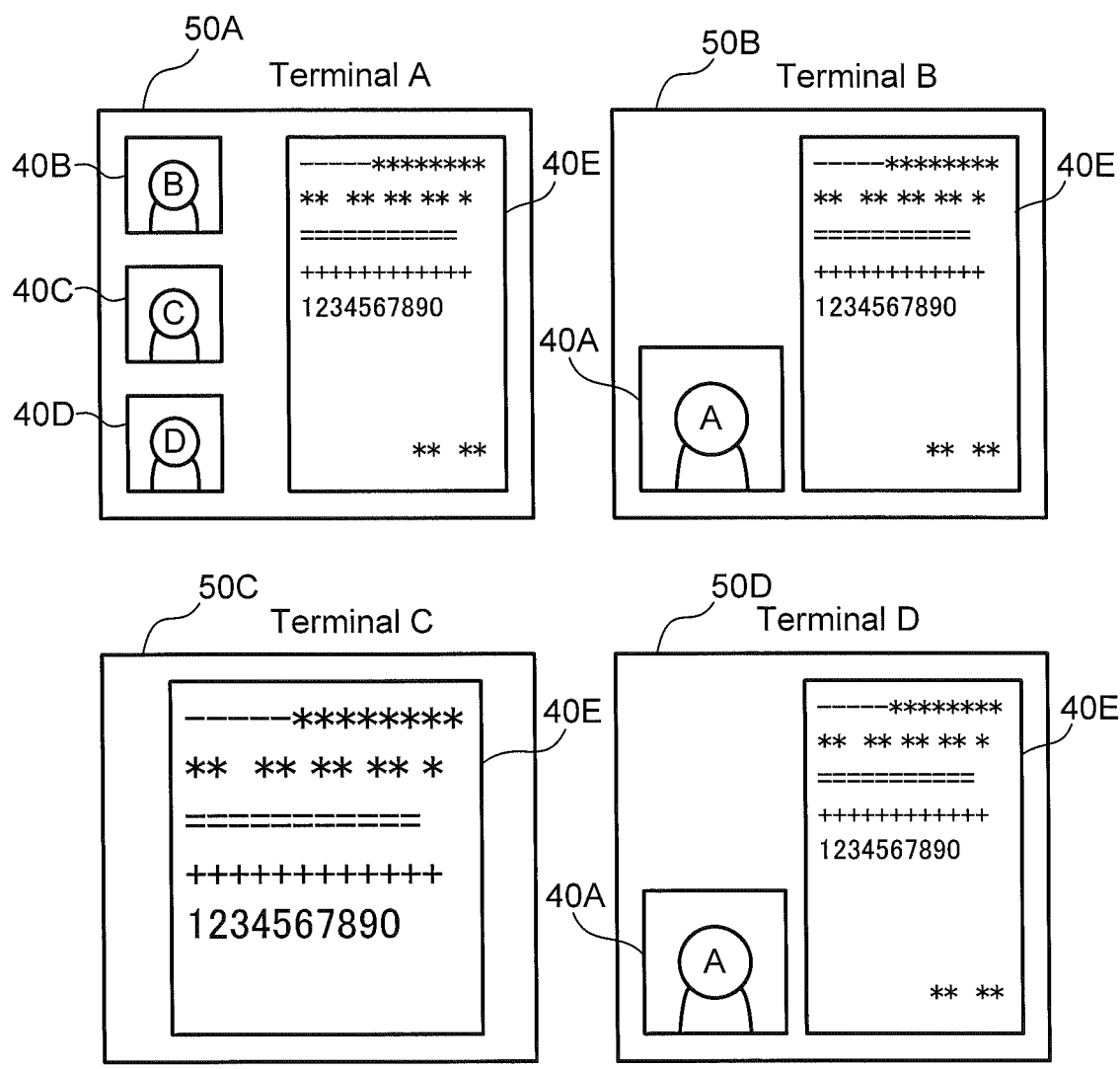
FIG. 5 illustrates detailed examples of conference data in the first illustrative embodiment according to one or more aspects of the disclosure.

With reference to FIGS. 3-5, detailed examples of the media data list 40 and the layout information list 50 will be described. It is assumed that a remote conference was started among four communication devices 1, e.g., the terminals A-D, on Jan. 1, 2012, at 12:00:00 p.m. (hereinafter, also indicated as "2012/01/01 12:00:00"), and terminal IDs "A", "B", "C", and "D" are assigned to the terminals A-D, respectively. The media data list 40 depicted in FIG. 3 may be generated for each conference identification information. The conference identification information identifies a remote conference that has previously been held or is currently being held and may include a generated conferenced identifier, URL, etc. The layout information list 50 depicted in FIG. 4A may also be generated for each conference identification information of the performed remote conference. The conference identification information will be described later.

Hereinafter, an example of a remote conference performing method will be described. For holding a remote conference among the plurality of communication devices 1, in the first illustrative embodiment, the program for performing a remote conference may be started by the communication device 1 that is to be a host of the remote conference. Then, a host user who uses the communication device 1 that is to be the host of the remote conference, e.g., the terminal A, may identify one or more participants (e.g., users of terminals B-D) with whom the host user would like to communicate with using the conference system 100. For example, a host user (e.g., user of terminal A) may send an email to users of other communication devices 1 (e.g., terminals B-D) to request them to join a conference on the conference system 100. First, the terminal A that is the host of the remote conference may issue a conference request for performance of a remote conference to the conference server 2. At that time, the conference request issued to the conference server 2 may include the terminal IDs (e.g., user names) of the users of terminals B-D that the host desires to participate with in the remote conference and the terminal ID of the host using terminal A of the remote conference. That is, the conference request may include the terminal IDs representing that the terminal A is the host of the remote conference and the terminals B-D are the participants of the remote conference. Authority information may also be assigned to the terminal A that is the host of the remote conference. More specifically, when the terminal A starts the program for performing a remote conference and is specified as the host of the remote conference, the authority information may be assigned to the terminal A. The assigned authority information may be temporarily stored in a predetermined storage area of the RAM 12. This assigned authority information may be deleted from storage when the conference ends. Then, the terminal A may transmit the conference identification information, the authority information, and the terminal ID of the terminal A to the conference server 2 and the recording server 3. The recording server 3 may then store the conference identification information, the authority information representing that the terminal A is the host of the remote conference, and the terminal ID "A" in the HDD 113 (or other memory) in association with each other, as depicted in FIG. 4B. For example, the terminal IDs, e.g., "A"-"D", of the terminals A-D that participate in the remote conference are stored, as a list, in association with the conference identification information, as depicted in FIG. 4B. In the list depicted in FIG. 4B, the authority information may also be stored in association with each terminal ID. The authority information may represent one of the host and the participant of the remote conference. In the first illustrative embodiment, when a communication device 1 is assigned authority information "TRUE", the communication device 1 may be assigned as the host and may have a host authority over the remote conference. When a communication device 1 is assigned authority information "FALSE", the communication device 1 may be assigned as the participant and may have a participant authority. The layout information list 50 depicted in FIG. 4A and the list depicted in FIG. 4B may be stored in the HDD 113 in association with the conference identification information. In some embodiments, attribute information representing the conference type specified by the host user may be stored in the HDD 113 in association with the media data list 40. The authority information may be assigned to the terminal A that is permitted to change layout of the remote conference.

The terminal A may issue the conference request to the conference server 2 using a predetermined application. In the first illustrative embodiment, for example, the terminal A may issue the conference request to the conference server 2 via the network 8, and to potential participants (e.g., terminals B-D) using an e-mail application as the predetermined application. Ultimately, the conference server 2 may store the terminal ID, authority information, and an e-mail address of each communication device 1 that is allowed to use the conference system 100, in association with each other.

Upon receipt of the conference request from the terminal A, the conference server 2 may transmit a predetermined uniform resource locator ("URL") of the conference server 2 on the network to the terminals B, C, D that are represented by the respective terminal IDs included in the conference request. A different URL is specified and transmitted to the terminals B, C, D every time a conference request for a different remote conference is issued. Upon receipt of the URL, the terminals B, C, D access the specified URL. As the terminals B, C, D access the URL, a session may be established between each terminal B, C, D and the conference server 2. When a session is established between a communication device 1 and the conference server 2, the conference server 2 may store information indicating the establishment of the session in a predetermined storage area indicated by the URL. A participant user may join the established remote conference session by executing a program in his/her communication device 1. In accordance with the session stored in the predetermined storage area of the conference server 2 indicated by the URL, the terminals A-D may be allowed to transmit and receive image data and audio data among one another.

As depicted in FIGS. 3 and 5, upon receipt of media data from each of the terminals A-D that are participating in the remote conference, the recording server 3 may store each received media data, as the media data list 40, in the HDD 113 (or other memory), in association with a corresponding one of the terminal IDs, e.g., "A"-"D", of the terminals A-D and the acquired date and time, e.g., "2012/01/01 12:00:00". For example, as depicted in FIG. 3, the media data list 40 comprises the media data 40A, e.g., "userA.mov", of the terminal A, the media data 40B, e.g., "userB.mov", of the terminal B, the media data 40C, e.g., "userC.mov", of the terminal C, the media data 40D, "userD.mov", of the terminal D, and the media data 40E, e.g., "Book1.doc", of the terminal A. The media data 40A-40D may be audio/video data generated based on the image data captured with the camera 33 and the audio data collected through the microphone 31, wherein the camera 33 and the microphone 31 are connected to the corresponding one of the terminals A-D. The media data 40E is material data inputted by the user of the terminal A through a keyboard, mouse, etc. In the first illustrative embodiment, the communication device 1, e.g., the terminal A, may transmit, to the recording server 3, image data and audio data captured or collected by the microphone 31 or the camera 33 in segments. Every time the recording server 3 receives the image data and the audio data from the terminal A, the received segment of image and audio data may be added to the media data 40A depicted in FIG. 3. The media data 40A is generated by the addition of the received image and audio data.

As depicted in FIGS. 4A and 5, the layout information 50A-50D received from the respective terminals A-D that are participating in the remote conference may be stored, as the layout information list 50, in the HDD 113 (or other memory) of the recording server 3 in association with the corresponding attribute information, e.g., the terminal IDs "A-D", and the corresponding specified date and time, e.g., "2012/01/01 12:00:00", respectively. Therefore, the layout information list 50 may comprise the layout information 50A, e.g., "layout U1", of the terminal A, the layout information 50B, e.g., "layout U2", of the terminal B, the layout information 50C, e.g., "layout U3", of the terminal C, and the layout information 50D, e.g., "layout U4", of the terminal D.

FIG. 5 illustrates conference data generated based on the layout information 50A-50D. The layout information 50A indicates a layout of image data displayed on the display device 34 of the terminal A. The layout information 50A indicates a layout, for example, in which the media data 40B-40D are displayed in a smaller size on a leftward part of a screen and the media data 40E is displayed in a larger size on a rightward part of the screen. The layout information 50B indicates a layout of image data displayed on the display device 34 of the terminal B, and the layout information 50D indicates a layout of image data displayed on the display device 34 of the terminal D. Each layout information 50B, 50D indicates a layout, for example, in which the media data 40A is displayed in a smaller size on a leftward part of a screen and the media data 40E is displayed in a larger size on a rightward part of the screen. The layout information 50C indicates a layout of image data displayed on the display device 34 of the terminal C. The layout information 50C indicates a layout, for example, in which only the media data 40E is displayed in a larger size on a central part of a screen.

While the remote conference is proceeding, the media data 40A-40E may be acquired by each terminal A-D. The media data may be acquired continuously so that a face-to-face interaction may be replicated. The acquired media data 40A-40E are outputted from each terminal A-D after being formatted in each terminal A-D based on the layout information 50A-50D specific to the terminal A-D. With this configuration, while the remote conference is proceeding, as depicted in FIG. 5, the conference data is displayed with a layout suitable for the display device 34 of each terminal A-D. Further, in some embodiments, during the remote conference, the layout being currently used may be changed. More specifically, one or more pieces of media data 40A-40E that are desired to be displayed on the display device 34 of each communication device 1 may be determined, based on predetermined layouts, from the media data 40A-40E that are being transmitted and received among the terminals A-D.

As depicted in FIG. 4A, the layout information list 50 further comprises, layout information 50E, e.g., "layout T1", layout information 50F, e.g., "layout T2", layout information 50G, e.g., "layout T3", and layout information 50H, e.g., "layout T4". The layout information 50E-50H may be stored in the HDD 113 in association with the respective attribute information. The attribute information may indicate the conference type of the remote conference in which the layout information is used. The conference type comprises, for example, a "decision-making conference", a "liaison conference", a "seminar", and a "presentation". For example, as depicted in FIG. 4A, the attribute information "decision-making conference" is associated with the layout information 50E. The specified date and time might not be associated with the layout information 50E-50H that are associated with the attribute information indicating the conference type of the remote conference (as opposed to attribute information indicating a terminal ID). The attribute information representing the conference type stored in the layout information list 50 depicted in FIG. 4A is specified when the remote conference is started. For example, the attribute information specified when the remote conference was started may be transmitted to the recording server 3 from each communication device 1 and then stored in the layout information list 50. As shown in FIG. 4A, the attribute information "liaison conference" is associated with the layout information 50F, the attribution information "seminar" is associated with the layout information 50G, and the attribute information "presentation" is associated with the layout information 50H.

With reference to FIGS. 6-13, processes performed by each communication device 1 and the recording server 3 in the conference system 100 will be described.

First, with reference to FIG. 6, a conferencing process performed in each communication device 1 will be described. The conferencing process may be carried out by the CPU 10 when a terminal-side conference program stored in the HDD 13 is started. That is, the conferencing process may be initiated in response to the selection of an application, which is designed for video conferencing, after the communication device 1 is turned on. In other embodiments, for example, the routine of a flowchart of FIG. 6 may be started when the communication device 1 is turned on.

Figure 6:
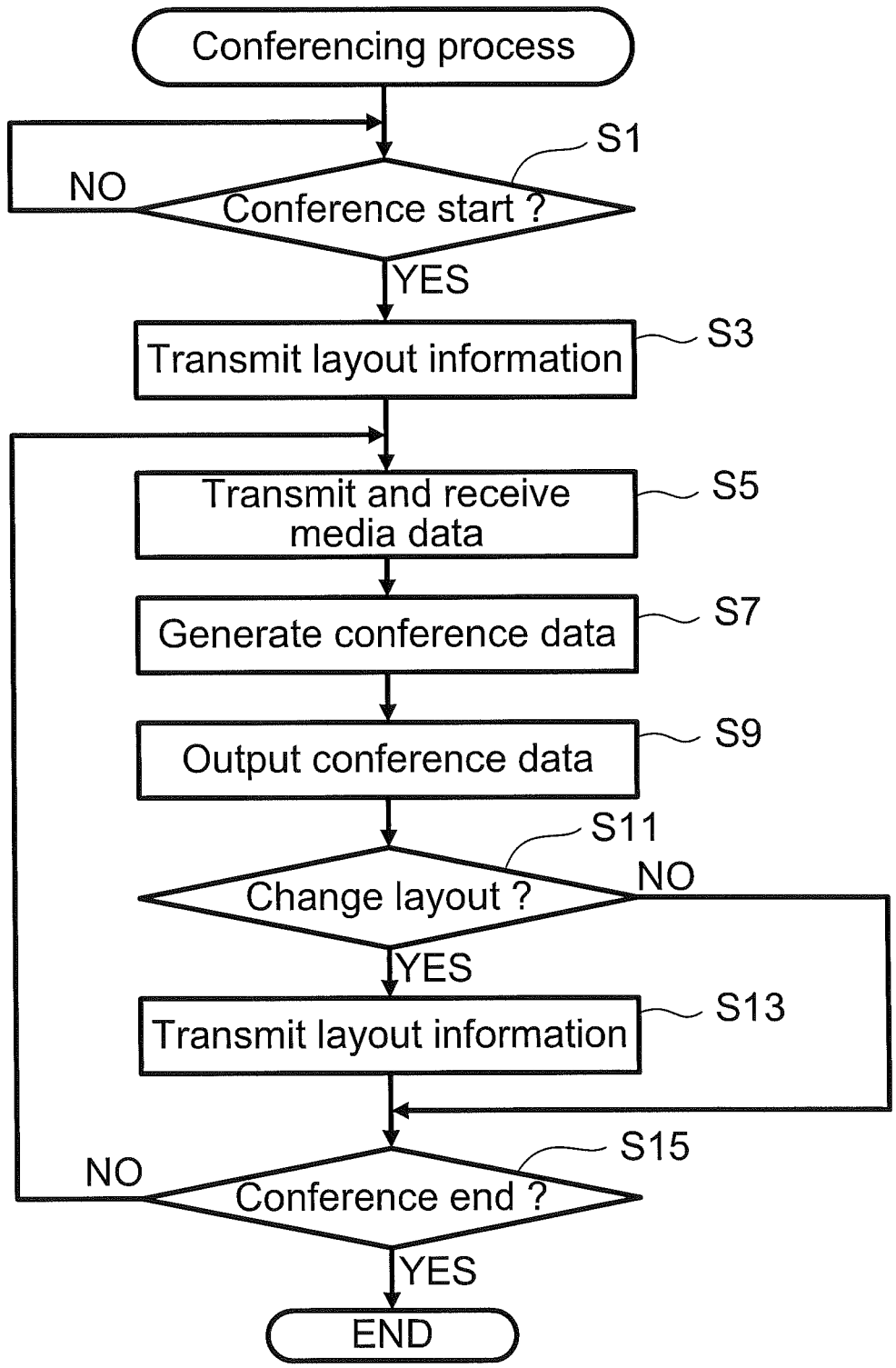
FIG. 6 is a flowchart depicting an example conferencing process in the first illustrative embodiment according to one or more aspects of the disclosure.

As depicted in FIG. 6, in the conferencing process, first, whether an instruction to start a remote conference (hereinafter, referred to as a "conference start instruction") has been issued may be determined (step S1). For example, when the user has performed an operation for starting the remote conference using the operating device 35, it may be determined that the conference start instruction has been issued (step S1: YES). When it is determined that the conference start instruction has not been issued (step S1: NO), the routine may repeat step S1. After the start instruction is issued, the URL for the conference identification information may be acquired by the communication device 1 from, for example, the conference server 2. When it is determined that the conference start instruction has been issued (step S1: YES), layout information representing a layout specified in the communication device 1, a device ID of the communication device 1, the received conference identification information, a specified date and time, and attribute information representing the conference type are transmitted to the conference server 2 and/or the recording server 3 (step S3). The specified date and time transmitted at step S3 represents the date and time when the layout information transmitted at step S3 is specified (e.g., selected) in the communication device 1. At step S3, when authority information is stored in the predetermined storage area of the RAM 12, the authority information may also be transmitted to the conference server 2 and/or the recording server 3.

Then, media data acquired by the communication device 1 and the device ID of the communication device 1 are transmitted to the conference server 2 and/or the recording server 3 (step S5). As described above, the conference server 2 may transmit the media data received from each communication device 1 to one or more other communication devices 1 that are being connected to the remote conference and are different from the sender of the media data. The communication device 1 may also receive the media data transmitted by the one or more other communication devices 1 from the conference server 2 (step S5). Then, the media data received at step S5 may be organized according to the layout information to generate conference data (step S7). That is, at step S7, the media data may be organized to have the layout indicated by the layout information specified in the communication device 1, thereby generating conference data. Then, image data included in the conference data may be outputted through the display device 34 and audio data included in the conference data may be outputted through the speaker 32 based on the conference data generated at step S7 (step S9).

After step S9, it may be determined whether a layout change instruction has been issued in the communication device 1 (step S11). For example, when the user has performed an operation for changing the layout of the conference data through the operating device 35, it may be determined that the layout change instruction has been issued (step S11: YES). When a layout change instruction is issued, the layout information, the device ID, and the date and time of the change may be transmitted to the conference server 2 and the recording server 3 (step S13). The layout information transmitted at step S13 represents a newly-specified layout. The device ID represents the device ID of the communication device 1 that performs the processing of step S13. The specified date and time transmitted at step S13 represents the date and time that the layout was changed. After step S13, at step S7, the conference data may be generated based on the newly-specified layout represented by the changed layout information. That is, when the layout change instruction is issued in the communication device 1 during the remote conference, the layout currently used for the conference data displayed on the display device 34 of the communication device 1 may be changed to the newly-specified layout based on the layout information transmitted at step S13.

After step S13 or when it is determined that the layout change instruction has not been issued (step S11: NO), it may be determined whether an instruction to end the remote conference (hereinafter, referred to as a "conference end instruction") has been issued (step S15). For example, when the user has performed an operation for ending the remote conference through the operating device 35, it may be determined that the conference end instruction has been issued (step S15: YES). Then, the output of the conference data may stop and the conferencing process may end. When it is determined that the conference end instruction has not been issued (step S15: NO), the routine may return to step S5.

Figure 7:
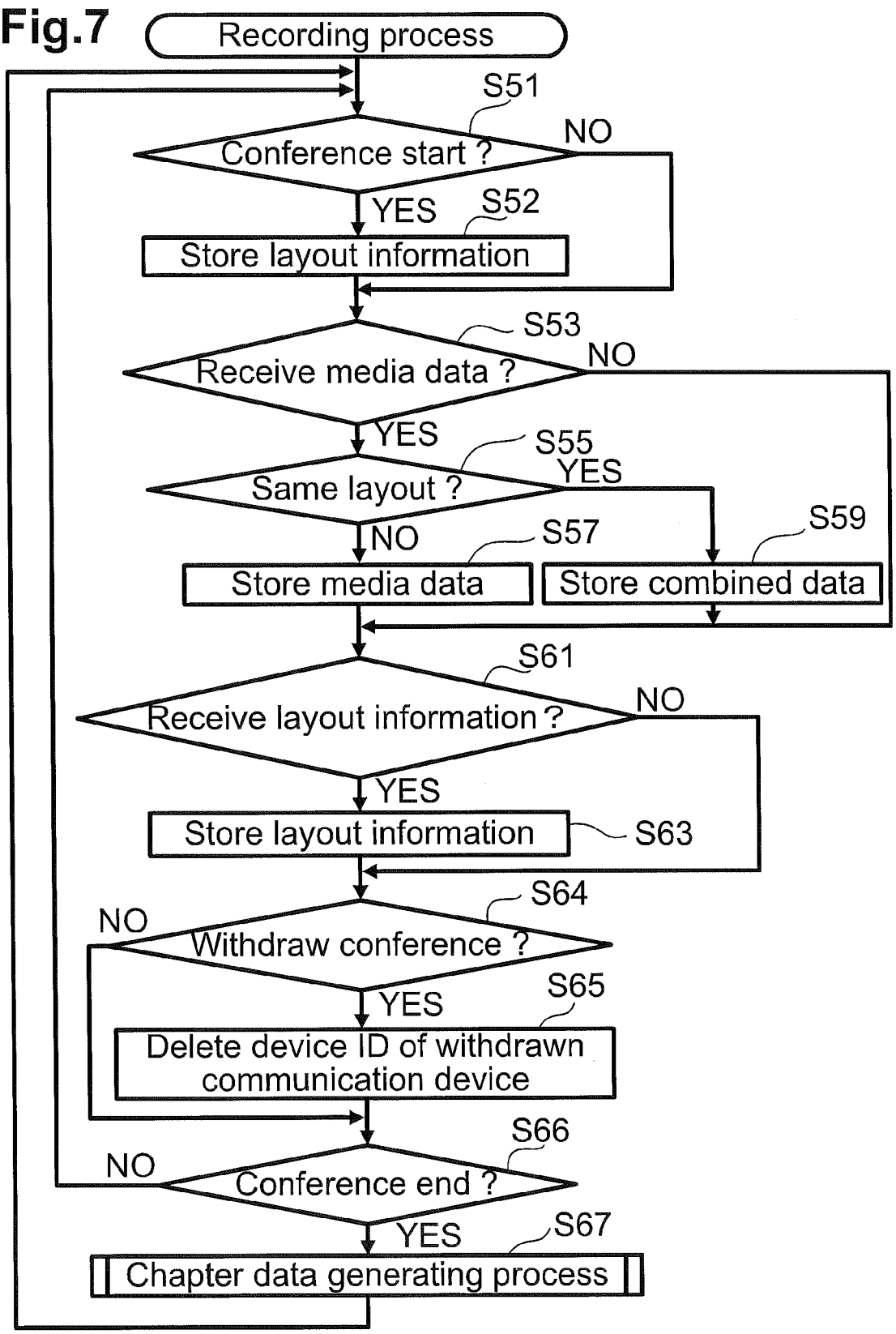
FIG. 7 is a flowchart depicting an example recording process in the first illustrative embodiment according to one or more aspects of the disclosure.

With reference to FIG. 7, a recording process performed in the recording server 3 will be described. The recording process may be performed by the CPU 110 in accordance with the server-side conference program stored in the HDD 113 while the recording server 3 has power applied thereto.

As depicted in FIG. 7, in the recording process, first, it may be determined whether an instruction to start a remote conference (hereinafter, referred to as a conference start instruction) has been issued (step S51). For example, when it is determined that a start instruction representing the start of the remote conference has been received from the communication device 1, it may be determined that the conference start instruction has been issued (step S51: YES). More specifically, in the first illustrative embodiment, at step S51, it may be determined whether the information transmitted by the communication device 1 at step S3 in FIG. 6 has been received. When it is determined that the information transmitted by the communication device 1 at step S3 in FIG. 6 has been received, it may be determined that the conference start instruction has been issued. When it is determined that the information transmitted by the communication device 1 at step S3 is FIG. 6 has not been received, it may be determined that the conference start instruction has not been issued. When it is determined that the conference start instruction has not been issued (step S51: NO), the routine may jump to step S53. When it is determined the conference start instruction has been issued (step S51: YES), the information received at step S51 may be stored in the HDD 113 (step S52). More specifically, at step S52, the layout information, the device ID, the specified date and time, the conference identification information, and the attribute information representing the conference type received at step S51 may be stored in the HDD 113 in association with each other, as depicted in FIG. 4A. When the authority information is also received at step S51, the conference information, the device ID, and the authority information received at step S51 may be stored in the HDD 113 in association with each other, as depicted in FIG. 4B. At step S52, the terminal ID and the conference identification information may be stored in the RAM 112 in association with each other. When the authority information is also received at step S51, the conference information, the device ID, and the authority information received at step S51 may be stored in the RAM 112 in association with each other. When the conference identification information received at step S51 has already been stored in the RAM 112, the device ID received at step S51 may be stored in the RAM 112 in association with the already-stored conference identification information.

Then, whether the media data has been received from the communication device 1 may be determined (step S53). When the communication device 1 transmits the media data to the recording server 3, the communication device 1 may transmit the media data and the device ID of the communication device 1 that is the sender of the media data. Every time the communication device 1 acquires media data, i.e., one or both of image data and audio data, the media data may be packetized and transmitted from the communication device 1 to the conference server 2 and the recording server 3. The remote conference includes the plurality of communication devices 1. Therefore, at step S53, in some cases, the recording server 3 may receive the media data simultaneously from the plurality of communication devices 1.

When it is determined that the media data has been received (step S53: YES), the routine proceeds to step S55. At step S55, the remote conference may be identified based on the conference identification information stored in the RAM 112 at step S52. More specifically, the conference identification information corresponding to the received device IDs may be identified from the information stored in the RAM 112. Then, it may be determined whether the layouts used in two or more of the communication devices 1 are the same as each other by referring to the layout information list 50 stored in the HDD 113 (step S55). More specifically, the device IDs corresponding to the identified conference identification information may be identified from the layout information list 50 stored in the HDD 113. Then, the layout information associated with the selected device IDs, respectively, may be identified from the layout information list 50. Using the identified information, at step S55, it may be determined whether two or more layouts are the same as each other.

When it is determined that the layouts used in the communication devices 1 are not the same as each other (step S55: NO), the media data received at step S53 may be stored in the HDD 113 in association with the respective device IDs received at step S53 (step S57). As depicted in FIG. 3, for example, the media data 40A is stored in the HDD 113 in association with the device ID "A", the acquired date and time when the media data was acquired at step S53, and the conference identification information. At step S53, in some cases, the recording server 3 may simultaneously receive the media data from the plurality of communication device 1. For example, it may be assumed that the recording server 3 simultaneously received media data from each of the terminals A-D at step S53. In this case, at step S57, as depicted in FIG. 3, the media data 40A "userA.mov" transmitted from the terminal A may be stored in the HDD 113 in association with the terminal ID "A". Further, at step S57, as depicted in FIG. 3, the media data 40B "userB.mov", the media data 40C "userC.mov", and the media data 40D "userD.mov" transmitted from the terminals B, C, and D, respectively, may be stored in the HDD 113 in association with the terminal IDs, "B", "C", and "D", respectively. When it is determined that the layouts used in the communication devices 1 are the same as each other (step S55: YES), the media data received from the plurality of communication devices 1 at step S53 may be organized into combined data and the combined data may be stored in the HDD 113 (step S59). In other embodiments, for example, the combined data may be stored in the HDD 113 in association with a combined date and time at the time the combination is made, instead of the acquired date and time depicted in FIG. 3. The combined data may be stored in the HDD 113 in association with the device IDs of the communication devices 1 that use the same layout, as depicted in FIG. 3.

After step S57 or step S59 or when the media data has not been received (step S53:NO), it may be determined whether the layout information has been received from the communication device 1 (step S61). When it is determined that the layout information has been received (step S61:YES), the received layout information may be stored in the HDD 113, as depicted in FIG. 4A (step S63). The layout information may be stored in the HDD 113 in association with the attribute information (e.g., the device ID of the sender), the specified date and time, and the conference identification information, as depicted in FIG. 4A.

After step S63 or when the layout information has not been received (step S61: NO), it may be determined whether a conference withdrawal instruction representing a withdrawal of the communication device 1 from the remote conference has been received (step S64). More specifically, the recording server 3 may receive the conference withdrawal instruction and the device ID of the communication device 1 that has transmitted the conference withdrawal instruction. For example, when the recording server 3 has received the conference withdrawal instruction from the communication device 1, it may be determined that the conference withdrawal instruction has been received (step S64: YES). Then, the recording server 3 may stop receiving the media data and the layout information from the communication device 1 that has transmitted the conference withdrawal instruction. At step S65, the device ID of the communication device 1 that has withdrawn from the remote conference may be deleted from the RAM 112 that stores the device IDs of the participating communication devices 1 associated with the conference identification information. When it is determined that the conference withdrawal instruction has not been received (step S64: NO), the routine may jump to step S66.

At step S66, it may be determined whether the remote conference has been ended. When all of the device IDs corresponding to the conference identification information have been deleted from the RAM 112, it may be determined that the remote conference has been ended. When one or more device IDs corresponding to the conference identification information are present in the RAM 112, it may be determined that the remote conference is still proceeding. When it is determined that the remote conference has been ended (step S66: YES), the routine may proceed to step S67. When it is determined that the remote conference is still active (step S66: NO), the routine may proceed to step S51. At step S67, the conference identification information may be deleted from the RAM 112 when it is determined that all of the device IDs corresponding to the conference identification information have been deleted at step S66. Then, at step S67, a chapter data generating process may be performed (step S67). More specifically, chapters may be created in the recorded remote conference represented by the conference identification information deleted at step S66. In the chapter data generating process, chapter data may be generated to divide the media data stored in the recording server 3 into a plurality of chapters. The chapter data generating process will be described later. After S67, the routine may return back to step S51.

Figure 8:
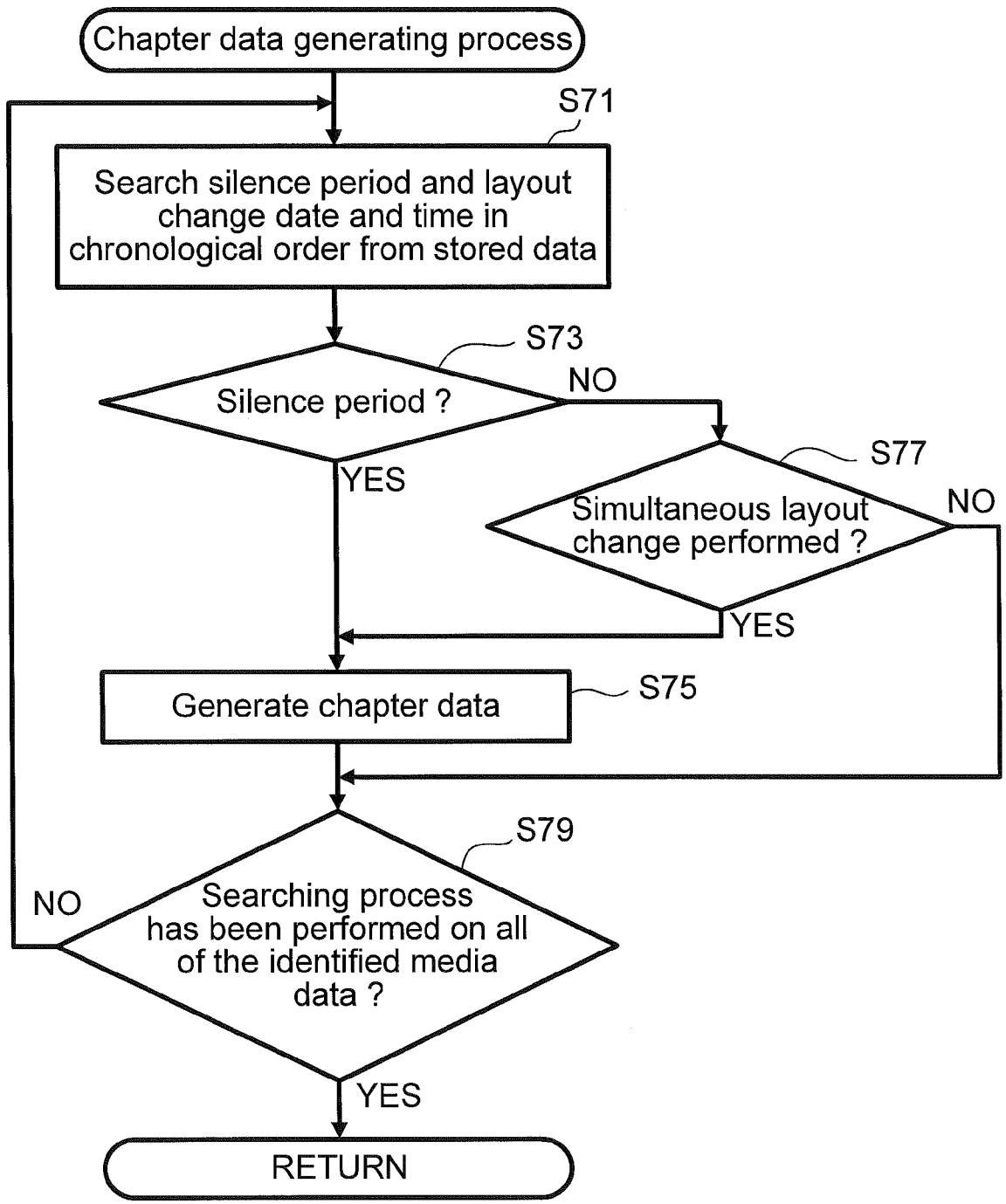
FIG. 8 is a flowchart depicting an example chapter data generating process in the first illustrative embodiment according to one or more aspects of the disclosure.

As depicted in FIG. 8, in the chapter data generating process, the media data and the layout information associated with the conference identification information of the remote conference that was ended at step S66 may be identified from the HDD 113. Then, one or more of the dates and times when a silence period or the layout change occurred may be searched in chronological order with reference to the acquired date and time of the identified media data or the specified date and time of the layout information (step S71). At step S73, it may be determined whether the identified media data includes a silence period in descending order of the acquired date and time (step S73). The silence period refers to, for example, a period during which audio data having at least a predetermined volume was not collected from any of the communication devices 1 that were participating in the remote conference. For example, the silence period refers to a period during which audio data has less than the predetermined volume and which lasts for a specified time period (e.g., five minutes) or longer. The silence period may be identified by analyzing the audio data included in the media data received from one or more of the communication devices 1 and comparing the audio data to determine when the audio data is below a predetermined volume. When it is determined that the media data includes a silence period (step S73: YES), the routine may proceed to step S75. When it is determined that the media data does not include a silence period (step S73: NO), the routine may proceed to step S77.

When the media data does not include a silence period (step S73: NO), it may be determined whether a simultaneous layout change has been performed (step S77). More specifically, it may be determined whether a predetermined number or more of the communication devices 1 underwent a layout information change within a predetermined time period of each other. This determination may be made with reference to the specified dates and times of the layout information list 50. When dates and times for the predetermined number or more of the communication devices 1 are within the predetermined time period, it may be determined that a simultaneous layout change has been performed (step S77: YES). When the predetermined number or more of the communication devices 1 do not have associated dates and times within the predetermined time period, it may be determined that the simultaneous layout change has not been performed (step S77: NO). When it is determined that the simultaneous layout change has been performed (step S77: YES), the routine may proceed to step S75. When it is determined that the simultaneous layout change has not been performed (step S77: NO), the routine may jump to step S79.

At step S75, chapter data may be generated based on the ending date and time of the silence period or the simultaneous layout change (step S75). The chapter data generation process will be described later in more detail with reference to FIG. 9.

After step S75 or when it is determined that the simultaneous layout change has not been performed (step S77: NO), it may be determined whether the searching processing of step S71 has been performed on all of the identified media data (step S79). When the searching processing has been performed on all of the identified media data (step S79: NO), the routine may return to step S71. When the searching processing has been performed on all of the identified media data (step S79: YES), the chapter data generating process may end.

Figure 9:
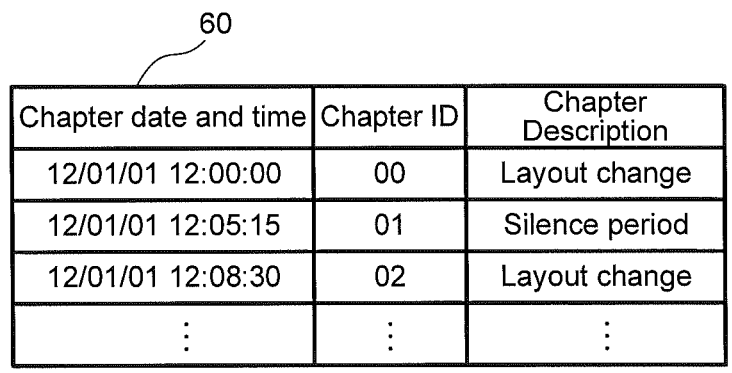
FIG. 9 is a diagram depicting an example structure of data included in a chapter data list in the illustrative embodiment according to one or more aspects of the disclosure.

Through the chapter data generating process, the chapter data may be generated at step S75 and stored, as a chapter data list 60, in the HDD 113 (or other memory), as depicted in FIG. 9. For example, when the remote conference is started on Jan. 1, 2012, at 12:00:00 p.m. among the terminals A-D, the recording server 3 may receive the layout information from the terminals A-D at approximately the same time. Therefore, it may be determined that that a simultaneous layout change has been performed (step S77: YES). Thus, chapter data having the chapter date and time "2012/01/01 12:00:00" may be generated and stored in the HDD 113 (step S75), as depicted in FIG. 9. More specifically, the date and time "2012/01/01 12:00:00" at which the simultaneous layout change has occurred in response to the start of the remote conference may be stored in the chapter data list 60, as the chapter date and time, in association with a chapter ID "00". Further, a chapter description (e.g., "layout change") that describes conditions of the conference at the timing at which the chapter data was generated may be stored in the chapter data list 60 in association with the chapter date and time and the chapter ID. In the "chapter description" column, a phrase, sentence, or other identifier for describing conditions of the conferences, such as a "silence period" and "layout change," may be stored.

When the media data includes a silence period during the remote conference (step S77: YES) and the silence period ended (or started) on or about Jan. 1, 2012, at 12:05:15 p.m., another chapter data having a chapter date and time "2012/01/01 12:05:15" may be generated and stored in the HDD 113, as depicted in FIG. 9 (step S75). When a simultaneous layout change was detected on or about Jan. 1, 2012, at 12:08:30 p.m. in the predetermined number or more of the communication devices 1 (e.g., the terminals A-C) (step S73: YES), still another chapter data having a chapter date and time "2012/01/01 12:08:30" may be generated. Then, the generated chapter data may be stored in the chapter data list 60 in association with a chapter ID "01" (step S75). Further, a timing "silence period" that is the timing at which the chapter data was generated is stored in the chapter data list 60 in association with the chapter date and time and the chapter ID. Each chapter data may be assigned a specific chapter ID for identifying the chronological order of the chapter data. In some embodiments, where the chapter ID is a number, the chronological order may correspond to the numeric order. For example, second chapter data having a chapter ID with a higher number than that of first chapter data may be identified as having a chronological order that is later in time than the first chapter data.

Figure 10:
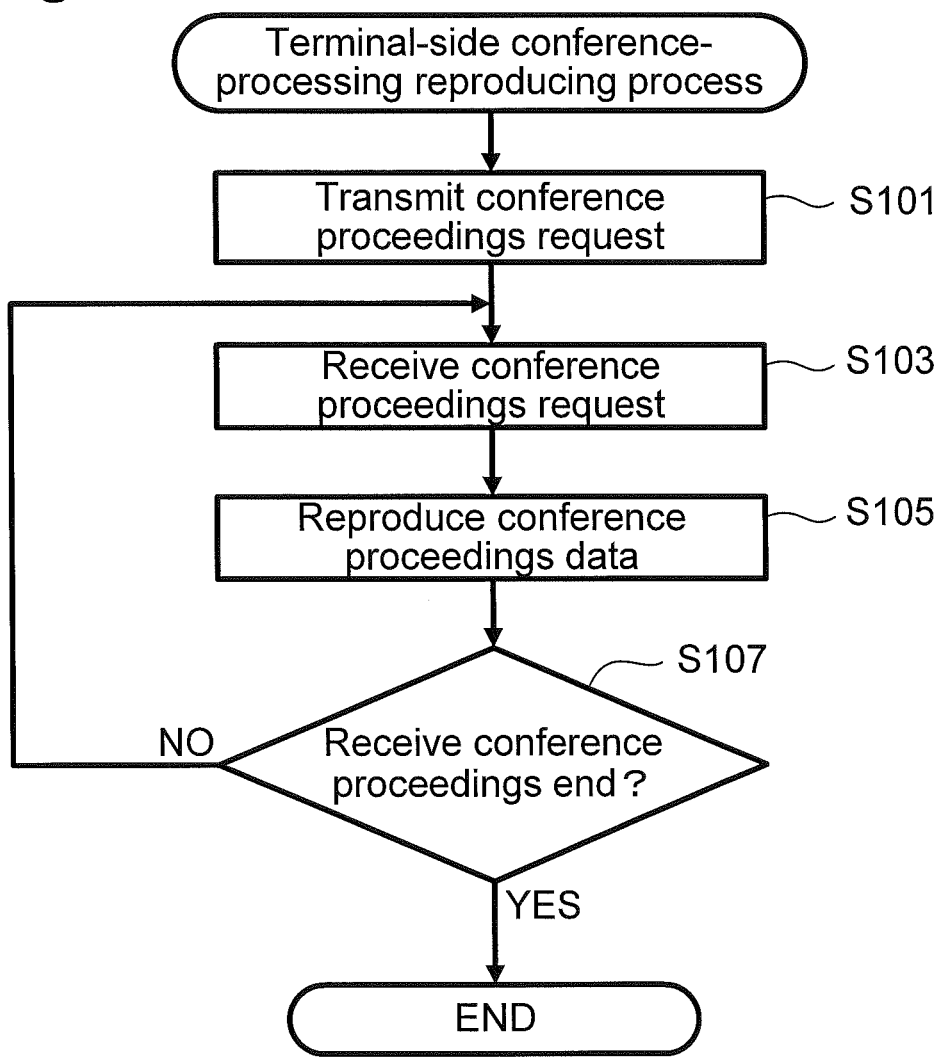
FIG. 10 is a flowchart depicting an example terminal-side conference-proceedings reproducing process in the first illustrative embodiment according to one or more aspects of the disclosure.

With reference to FIG. 10, a terminal-side conference-proceedings reproducing process performed in the communication device 1 will be described. The terminal-side conference-proceedings reproducing process may be performed by the CPU 10 in accordance with the terminal-side conference program stored in the HDD 13, for example, when the user performs an operation for requesting conference proceedings of a desired remote conference using the operating device 35. In other embodiments, for example, the user may input attribute information, e.g., the device ID or the conference type, assigned to the desired remote conference, as part of the operation for requesting the conference proceedings.

As depicted in FIG. 10, in the terminal-side conference-proceedings reproducing process, first, a request for conference proceedings of a desired remote conference may be transmitted to the recording server 3 (step S101). Hereinafter, the request for the conference proceedings is referred to as a "conference proceedings request". The conference proceedings request may include the device ID of the communication device 1 that requests the conference proceedings and the conference identification information. The conference proceedings request further includes the attribute information. In the operation for requesting the conference proceedings, the user may be allowed to input the attribute information, e.g., the device ID or the conference type. When the attribute information is inputted in the operation for requesting the conference proceedings, the conference proceedings request may include the inputted attribute information.

Then, conference proceedings data may be received from the recording server 3 (step S103). After that, the conference proceedings data received at step S103 may be reproduced while the image data is outputted through the display device 34 and the audio data is outputted through the speaker 32 (step S105). With this configuration, the image and the audio of the desired remote conference that was previously held and recorded may be reproduced in the communication device 1. After that, it is determined whether a conference proceedings end instruction has been received from the recording server 3 (step S107). The conference proceedings end instruction represents the end of the conference proceedings. When it is determined that the conference proceedings end instruction has been received (step S107: YES), the reproduction of the conference proceedings data may be stopped and the terminal-side conference-proceedings reproducing process may end. When it is determined that the conference proceedings end instruction has not been received (step S107: NO), the routine returns to step S103 to continuously receive and reproduce the conference proceedings data.

Figure 11:
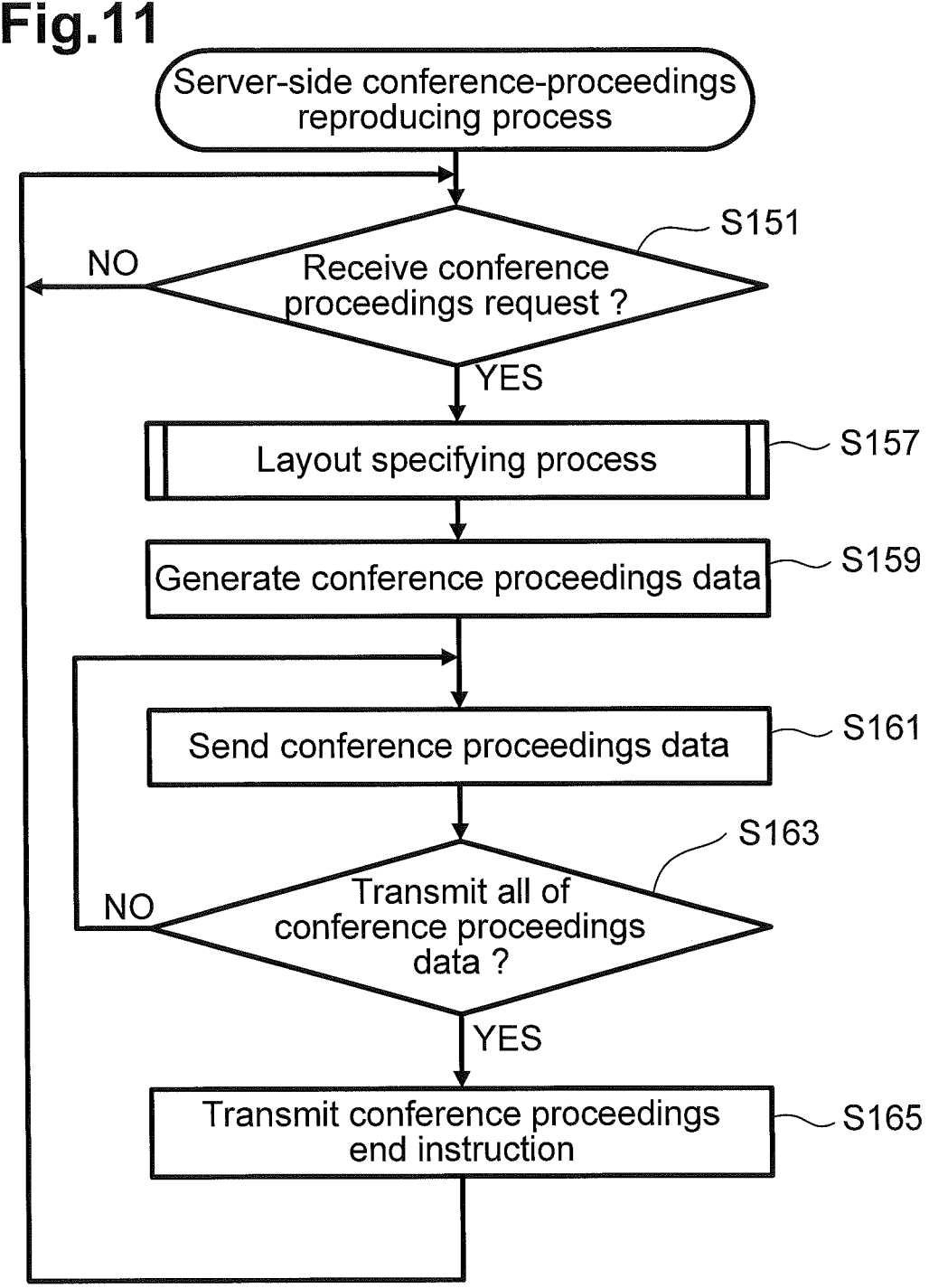
FIG. 11 is a flowchart depicting an example server-side conference-proceedings reproducing process in the first illustrative embodiment according to one or more aspects of the disclosure.

With reference to FIG. 11, a server-side conference-proceedings reproducing process performed in the recording server 3 will be described. The server-side conference-proceedings reproducing process may be performed by the CPU 110 in accordance with the server-side conference program stored in the HDD 113 while the recording server 3 has power applied thereto.

As depicted in FIG. 11, in the server-side conference-proceedings reproducing process, first, whether the conference proceedings request has been received from the communication device 1 may be determined (step S151). When it is determined that the conference proceedings request has been received (step S151: YES), a layout specifying process may be performed (step S157). The layout specifying process will be described in detail later. When it is determined that the conference proceedings request has not been received (step S151: NO), the routine may repeat step S151.

After step S157, conference proceedings data may be generated (step S159). More specifically, the media data associated with the conference identification information included in the conference proceedings request received at step S151 may be identified from the HDD 113. Then, the conference proceedings data may be generated based on the identified media data and the layout represented by the layout information determined at step S157. At step S159, the conference proceedings data, including the stored chapter data that were generated at step S67, may be generated. The conference proceedings data will be described in detail later.

At step S159, the media data to be used for generating the conference proceedings data may be the above-described combined data. In this case, the conference proceedings data may be generated by arranging the above-described combined data and the identified media data in chronological order.

Then, the conference proceedings data generated at step S159 may be transmitted to the communication device 1 that is the sender of the conference proceedings request (step S161). After that, it may be determined whether all of the contents of the conference proceedings data have been transmitted (step S163). When it is determined that all of the contents of the conference proceedings data have not been transmitted (step S163: NO), the routine may repeat step S161. When it is determined that all of the contents of the conference proceedings data have been transmitted (step S163: YES), a conference proceedings end instruction may be transmitted to the communication device 1 that is the sender of the conference proceedings request (step S165). After step S165 or when the conference proceedings request has not been received (step S151: NO), the routine may return to or repeat step S151.

Figure 12:
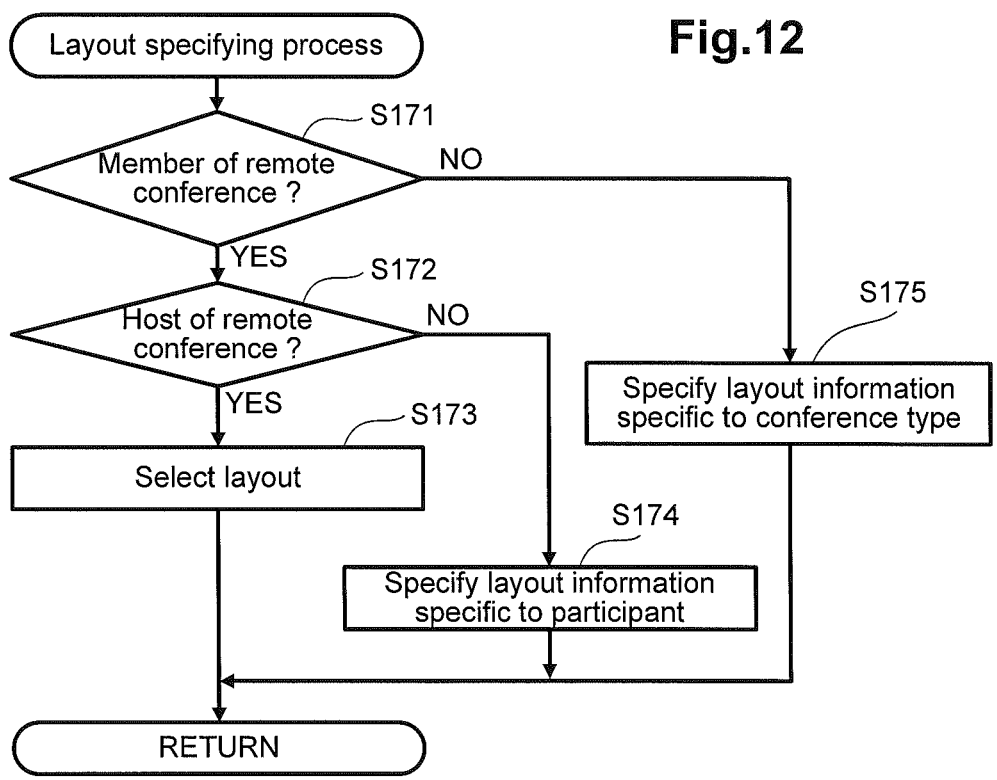
FIG. 12 is a flowchart depicting an example layout specifying process in the first illustrative embodiment according to one or more aspects of the disclosure.

As depicted in FIG. 12, in the layout specifying process, first, whether the device ID that is included in the conference proceedings request received at step S151 is stored in the media data list 40 depicted in FIG. 3 may be determined (step S171). This determination may be based on the conference identification information and the device ID included in the conference proceedings request. More specifically, when the device ID received at step S151 is stored in the media data list 40 depicted in FIG. 3, it may be determined that the communication device 1 that is the sender of the conference proceedings request was a member of the remote conference (step S171: YES). When the device ID received at step S151 is not stored in the media data list 40 depicted in FIG. 3, it may be determined that the communication device 1 that is the sender of the conference proceedings request was not a member of the remote conference (step S171: NO). When it is determined that the communication device 1 was a member of the remote conference (step S171: YES), the routine may proceed to step S172. When it is determined that the communication device 1 was not the member of the remote conference (step S171: NO), the routine may proceed to step S175.

At step S172, it is determined, with reference to the list depicted in FIG. 4B, whether "TRUE" is the value of the authority information assigned to the conference identification information and the device ID included in the conference proceedings request received at step S151. When it is determined that "TRUE" is the value of the authority information assigned to the conference identification information and the device ID, it may be determined that the communication device 1 that is the sender of the conference proceedings request was the host of the remote conference. When it is determined that "TRUE" is not the value of the authority information assigned to the conference identification information and the device ID, it may be determined that the communication device 1 that is the sender of the conference proceedings request was not the host of the remote conference, and instead was a participant of the remote conference (step S172: YES). When it is determined that the communication device 1 was the host of the remote conference (step S172: YES), the routine may proceed to step S173. When it is determined that the communication device 1 was not the host but a participant of the remote conference (step S172: NO), the routine may proceed to step S174.

At step S173, an arbitrary layout may be selected from the layout information associated with the attribute information representing one of the members or the connection types depicted in FIG. 4A. For example, when the attribute information included in the conference proceedings request received at step S151 represents the device ID "A", the layout information 50A may be specified. Then, the conference proceedings data may be generated based on the layout information 50A at step S159 in the recording server 3 and the generated conference proceedings data may be reproduced at step S105 in the communication device 1 that sent the conference proceedings request. Accordingly, the user of the communication device 1 may view a playback of the recorded remote conference using the layout that was used by the terminal A while the remote conference was held. Similarly, when it is determined that the communication device 1 was the host of the remote conference at step S172 or when the attribute information included in the conference proceedings request represents one of the device IDs "B", "C", "D", the conference proceedings data generated based on the layout information 50B, 50C, 50D may be reproduced. As described above, when the user of the communication device 1 was the host of the remote conference, the user may be allowed to select one of the members of the recorded remote conference to view a playback of the recorded remote conference from the member's point of view. Meanwhile, other participants (e.g., other than the host) might not be allowed to view a playback of the recorded remote conference from another member's point of view.

Figure 13:
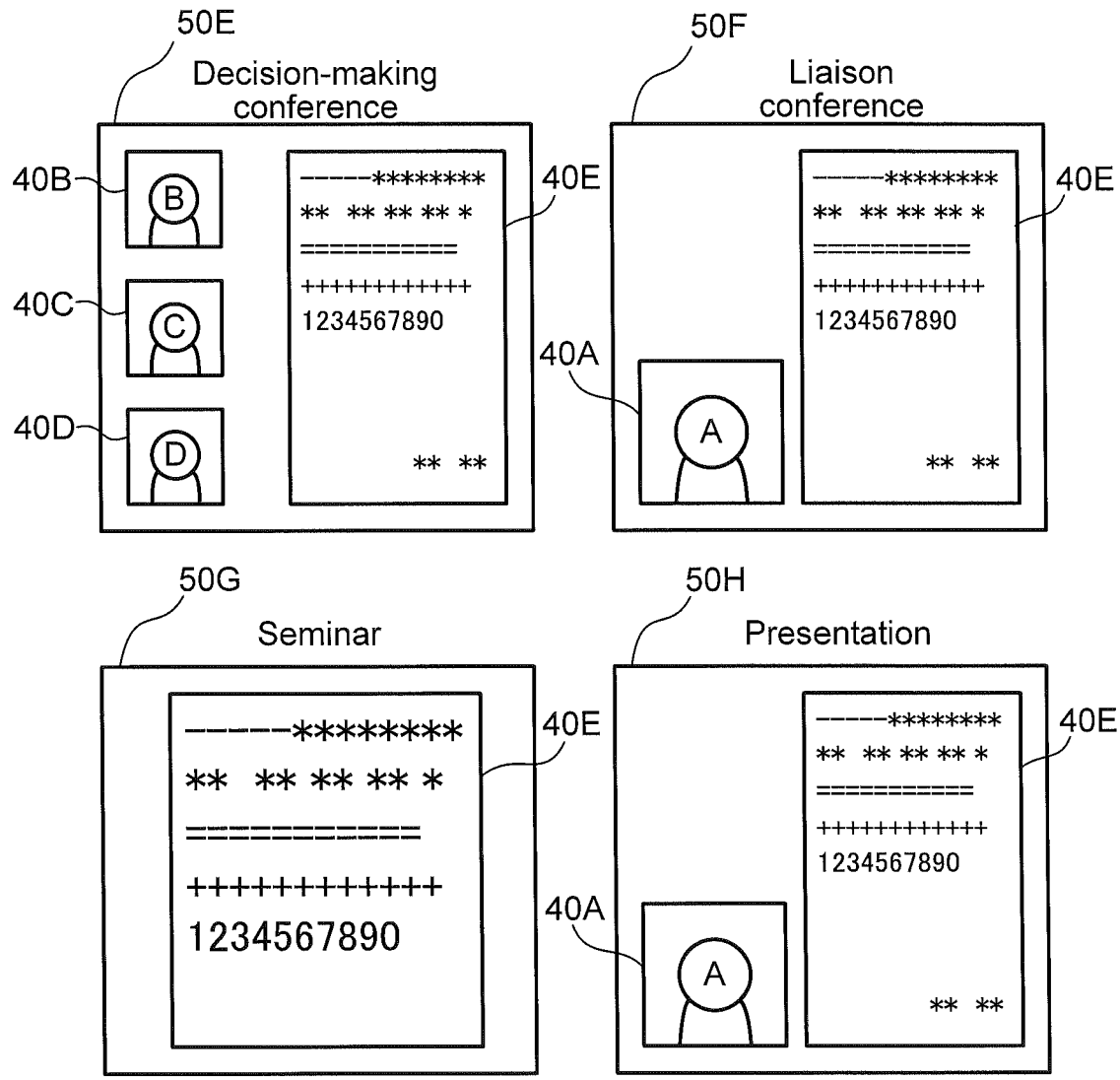
FIG. 13 illustrates detail examples of conference data of another type in the first illustrative embodiment according to one or more aspects of the disclosure.

At step S173, when the attribute information included in the conference proceedings request received at step S151 represents the "decision-making conference", the layout information 50E depicted in FIG. 13 may be specified. In the decision-making conference, generally, opinions of the participants of the conference are summarized under the leadership of the host of the remote conference. Therefore, the layout information 50E represents a layout in which moving image data of participants are mainly displayed. For example, when the user of the terminal A is the host of the remote conference, the moving image data of the participants, e.g., the media data 40B-40E, except the moving image data of the host of the remote conference, e.g., the media data 40A, may be displayed in the layout of the layout information 50E.

At step S173, when the attribute information included in the conference proceedings request received at step S151 represents the "liaison conference", the layout information 50F depicted in FIG. 13 may be specified. In the liaison conference, generally, the host of the remote conference provides information to the participants. Therefore, the layout information 50F represents a layout in which the host of the remote conference is mainly displayed. For example, when the user of the terminal A is the host of the remote conference, the moving image data of the host of the remote conference, e.g., the media data 40A, and the material data, e.g., the media data 40E, may be displayed in the layout of the layout information 50F.

At step S173, when the attribute information included in the conference proceedings request received at step S151 represents the "seminar", the layout information 50G depicted in FIG. 13 may be specified. In the seminar, for example, the host of the remote conference provides teaching to the participants. Therefore, the layout information 50G represents a layout specified by the host of the remote conference. For example, only a teaching material, e.g., the material data 40E, may be displayed in the layout of the layout information 50G so that the participants can refer to the teaching material.

At step S173, when the attribute information included in the conference proceedings request received at step S151 represents the "presentation", the layout information 50H depicted in FIG. 13 may be specified. In the presentation, generally, a plurality of participants hear a presentation made by the host of the remote conference. Therefore, the layout information 50H represents a layout suitable for a large majority of the participants. For example, a layout of the layout information 50H may be specified based on majority rule from a plurality of kinds of layout information used by the participants of the remote conference. It is assumed that the user of the terminal A is a presenter who is the host of the remote conference and the users of the terminals B-D are participants and the layouts represented by the layout information 50A-50D are used in the terminals A-D, respectively, as depicted in FIG. 5. In this case, the layouts represented by the layout information 50B, 50D depicted in FIG. 5 are used by more members. Therefore, the layout information 50H depicted in FIG. 13 is specified as the layout of the attribute information "presentation".

At step S174, layout information specific to the participant may be specified. More specifically, when the attribute information included in the conference proceedings request received at step S151 represents one of the device IDs "B"-"D", a corresponding one of the layout information for the terminals B-D that are the participants may be specified. Then, the conference proceedings data may be reproduced based on the specified layout information.

At step S175, layout information specific to the conference type may be specified. When it is determined that the communication device 1 was not the member of the remote conference at step S171, at step S175, predetermined layout information may be specified from the plurality of kinds of layout information specific to the conference type. When the attribute information representing the conference type is included in the conference proceedings request received at step S151, the layout information corresponding to the attribute information representing the conference type may be specified. When the attribute information representing the conference type is not included in the conference proceedings request received at step S151, the conference identification information of the requested conference proceedings and the attribute information associated with the specified conference identification information may be specified. In this case, the specified attribute information represents the conference type. The layout information corresponding to the specified attribute information representing the conference type may also be specified.

As described above, in the first illustrative embodiment, when the attribute information represents the member of the remote conference, the layout information used by the member during the remote conference may be specified. Therefore, the user may be allowed to view the conference proceedings data of the recorded remote conference in the suitable layout that is similar to the layout used by the member of the remote conference. When the attribute information represents the conference type, the user may be allowed to view the conference proceedings data of the recorded remote conference in the layout suitable for the conference type.

Further, in the conference proceedings data generated at step S159, the chapters are allowed to be accessed based on the chapter data generated in the chapter generating process during the reproduction of the conference proceedings data. For example, the conference proceedings data can be reproduced by chapter. Therefore, the user may view the conference proceedings data more efficiently. In the example depicted in FIG. 9, the conference proceedings data can be played from a desired portion, e.g., Jan. 1, 2012, at 12:05:15 p.m. (i.e., "2012/01/01 12:05:15") of the recorded remote conference by accessing to the chapter data having the chapter ID "01".

As described above, according to the first illustrative embodiment, the conference proceedings data having the layout represented by the specified layout information is generated based on the media data stored in the HDD 113 of the recording server 3 and the generated conference proceeding data may be outputted. That is, the conference proceedings data may be generated by using the layout corresponding to the attribute information of the requesting user. Therefore, the recording server 3 may provide the conference proceedings data having a layout suitable for the requesting user.

Figure 14:
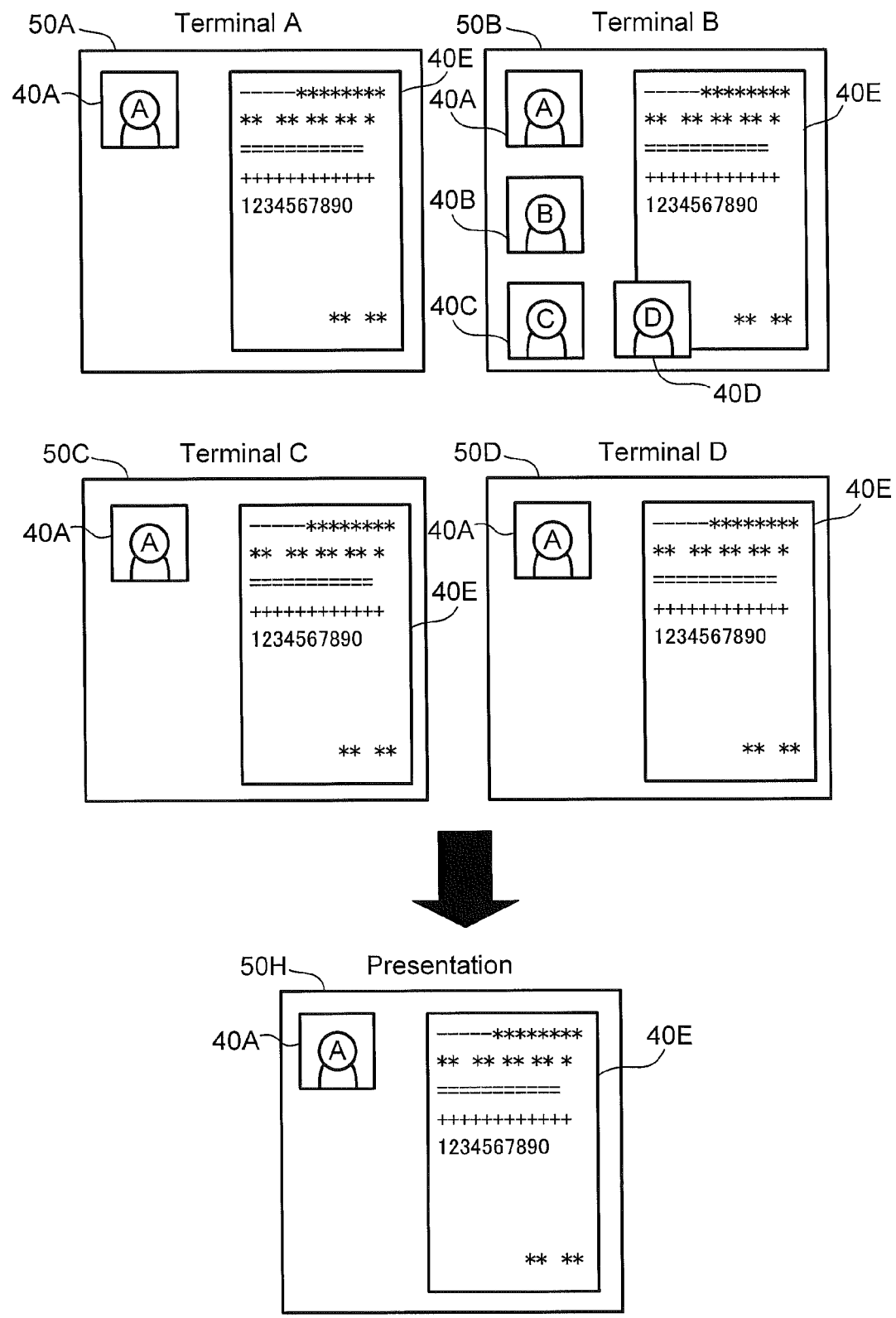
FIG. 14 illustrates details examples of conference data of still another type in the first illustrative embodiment according to one or more aspects of the disclosure.

At step S159, the layout information 50H of the conference type "presentation" depicted in FIG. 13 may have a layout that is a combination of each layout information used by the members of the remote conference. As depicted in FIG. 14, the layout information 50H may be generated by combining the layout information 50A, 50C, 50D of the members together. More specifically, the media data may be displayed in the layout information 50H by using the layout, i.e., the size and location, that is used mostly in the communication devices 1 of the members of the remote conference. That is, the layout that was used by the terminals A, C, D, and in which the material data, e.g., the media data 40E, and the moving image data, e.g., the media data 40A, are displayed is specified. Therefore, conference proceedings data having an appropriate layout may be generated by using the layout that was used by more members.

At step S159, layout information suitable for personal information may be specified as the layout information 50G of the conference type "seminar" depicted in FIG. 13. In this case, the personal information may be information representing, for example, an age, occupation, or company. The personal information may be inputted when the operation for requesting the conference proceedings is performed. The layout information suitable for the personal information may be selected from the layout information list 50 stored in the HDD 113. Thus, appropriate conference proceedings data may be generated using the layout suitable for the member based on the personal information.

Hereinafter, with reference to FIGS. 15A, 15B, 15C, 16A, and 16B, a second illustrative embodiment will be described. In the second illustrative embodiment, an explanation will be given mainly for the different parts, and an explanation will be omitted for the common parts by assigning the same reference numerals thereto.

Figure 15A:
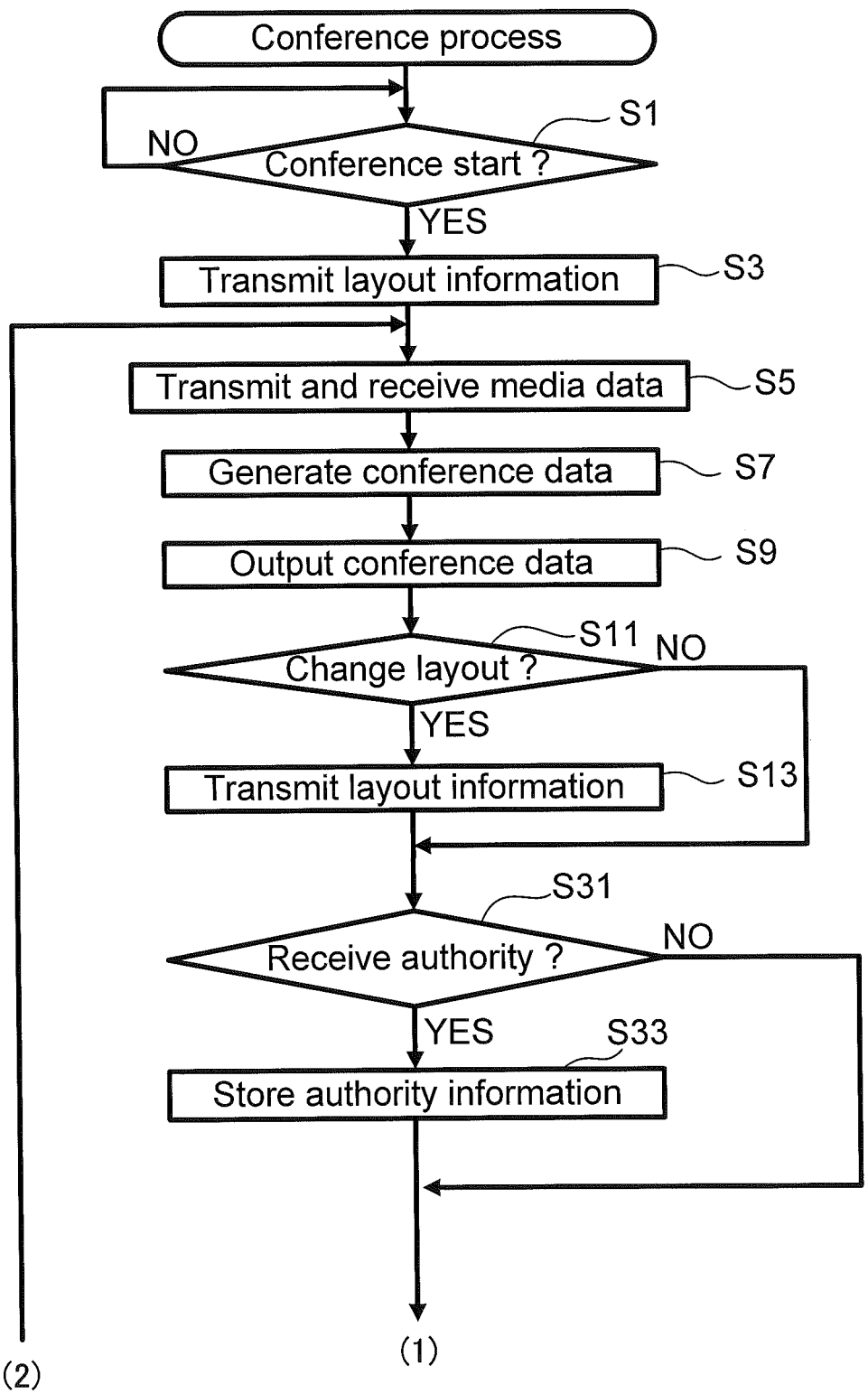
FIG. 15A is a flowchart depicting an example conferencing process in a second illustrative embodiment according to one or more aspects of the disclosure.

As depicted in FIG. 15A, processing of steps S1-S13 of a conferencing process according to the second illustrative embodiment may be similar to the processing of steps S1-S13 of the conferencing process according to the first illustrative embodiment depicted in FIG. 6. Accordingly, an explanation for the processing of steps S1-S13 of the conferencing process according to the second illustrative embodiment will be omitted.

At step S31, it may be determined whether an authority assignment instruction has been received. More specifically, it may be determined whether the authority assignment instruction has been received from the communication device 1 that is the host of the remote conference. When it is determined that the authority assignment instruction has been received (step S31: YES), the routine may proceed to step S33. When it is determined that the authority assignment instruction has not been received (step S31: NO), the routine may proceed to step S35.

At step S33, the authority information included in the authority assignment instruction received at step S31 is stored in the predetermined storage area of the RAM 12. Then, the authority information received at step S31 and the device ID of the communication device 1 are transmitted to the recording server 3.

Figure 15B:
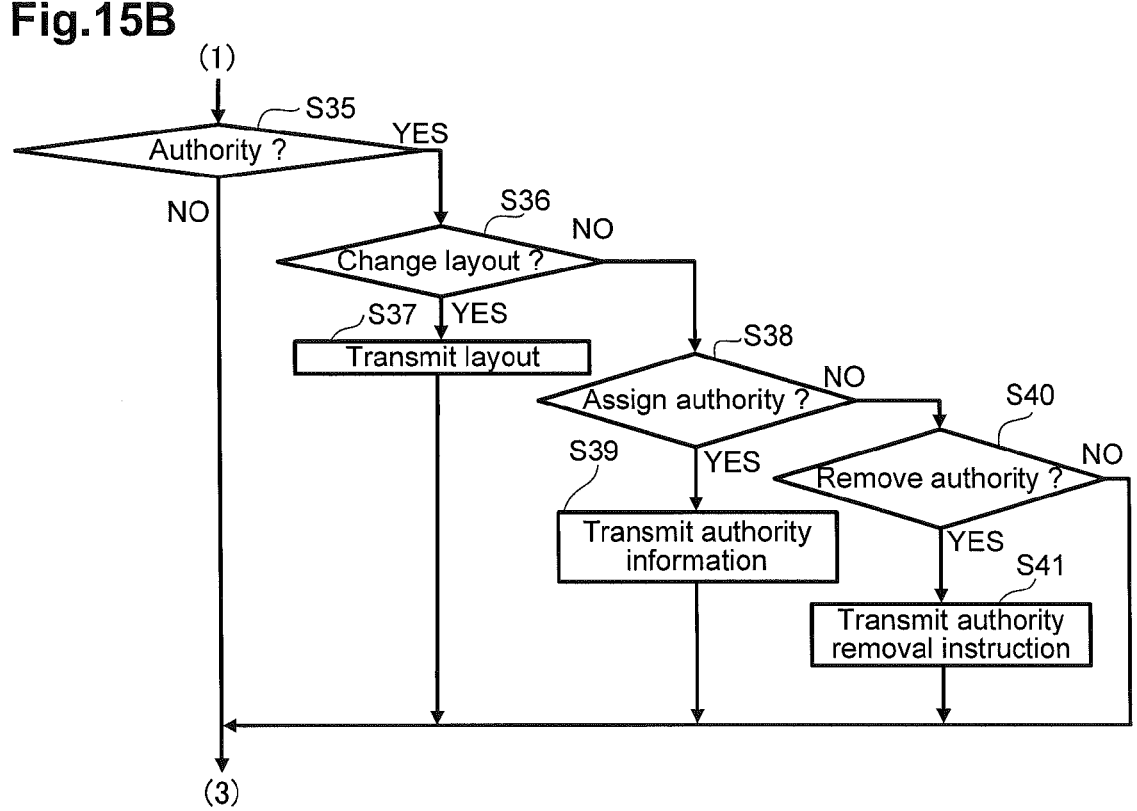
FIG. 15B is a continuation of the flowchart of FIG. 15A in the second illustrative embodiment according to one or more aspects of the disclosure.

As depicted in FIG. 15B, at step S35, it may be determined whether the authority information represents the host of the remote conference with reference to the authority information stored in the predetermined storage area of the RAM 12 at step S33. When it is determined that the authority information represents the host of the remote conference (step S35: YES), the routine may proceed to step S36. When it is determined that the authority information does not represent the host of the remote conference (step S35: NO), the routine may proceed to step S42. At step S35, it may be determined whether the authority information represents a communication device that is permitted to change a layout of the remote conference with reference to the authority information stored in the predetermined storage area of RAM 12 at step S33.

At step S36, it may be determined whether a layout change of one or more other communication devices 1 has been requested. When it is determined that the layout change has been requested (step S36: YES), the routine may proceed to step S37. When it is determined that the layout change has not been requested (step S36: NO), the routine may proceed to step S38.

At step S37, a layout change instruction may be transmitted to the one or more target communication devices 1. More specifically, the layout information representing a newly-specified layout may be transmitted to the one or more target communication devices 1.

At step S38, it may be determined whether a transfer of the host authority to another communication device 1 has been requested. When it is determined that the transfer of the host-authority has been requested (step S38: YES), the routine may proceed to step S39. When it is determined that the transfer of the host-authority has not been requested (step S38: NO), the routine may proceed to step S40.

At step S39, the authority information representing the host of the remote conference is transmitted to the target communication device 1. More specifically, the authority information representing the host of the remote conference is transmitted to the target communication device 1 represented by the device ID requested at step S41. Further, the authority information representing the host of the remote conference and the device ID of the communication device 1 to which the host authority is to be transferred are transmitted to the recording server 3.

At step S40, it is determined whether removal of the host authority from the another communication device 1 has been requested. When it is determined that the removal of the host-authority has been requested (step S40: YES), the routine may proceed to step S41. When it is determined that the removal of the host-authority has not been requested (step S40: NO), the routine may proceed to step S42.

At step S41, a host-authority removal instruction is transmitted to the another communication device 1. More specifically, the host-authority removal instruction is transmitted to the target communication device 1 represented by the device ID requested at S45.

Figure 15C:
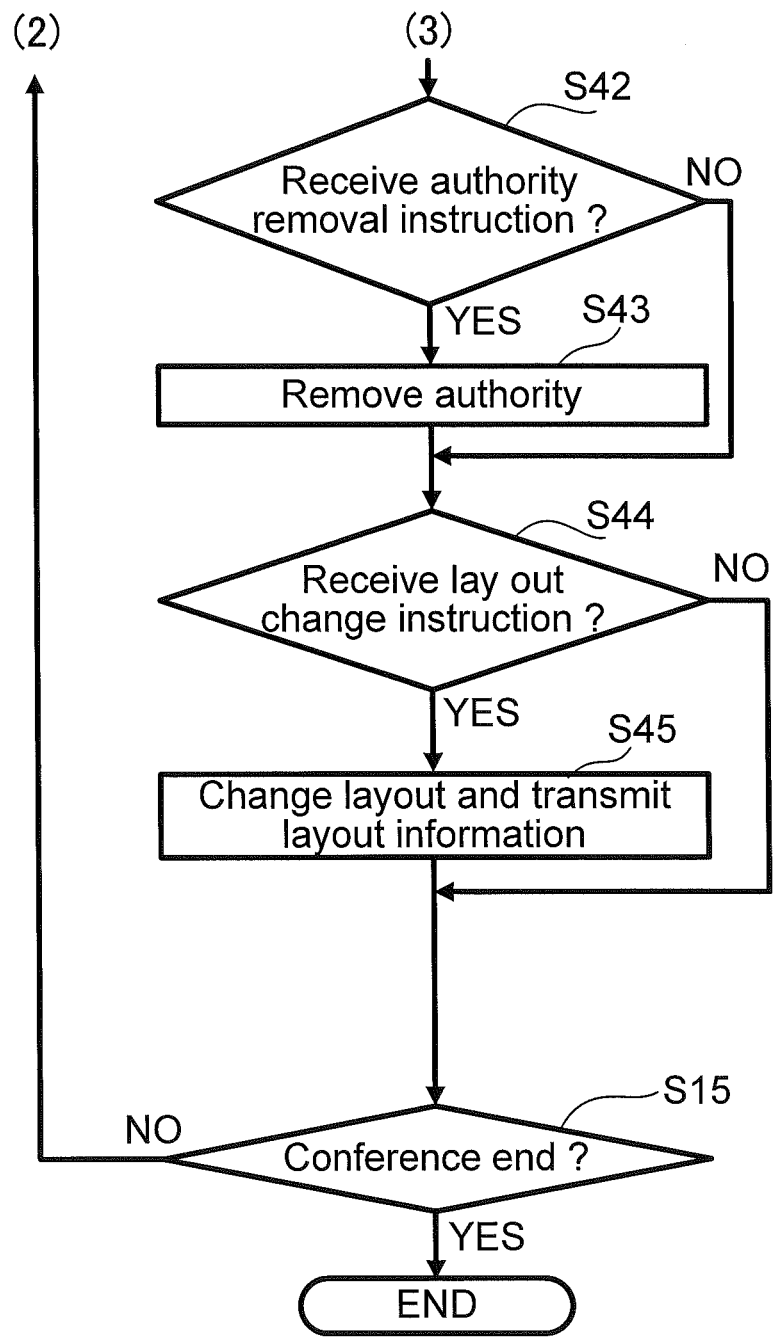
FIG. 15C is a continuation of the flowcharts of FIGS. 15A and 15B in the second illustrative embodiment according to one or more aspects of the disclosure.

As depicted in FIG. 15C, at step S42, it may be determined whether the host-authority removal instruction has been received. When it is determined that the host-authority removal instruction has been received (step S42: YES), the routine may proceed to step S43. When it is determined that the host-authority removal instruction has not been received (step S42: NO), the routine may proceed to step S44.

At step S43, the host-authority may be removed from the communication device 1.

At step S44, it may be determined whether a layout change instruction has been received from another communication device 1. When it is determined that the layout change instruction has been received (step S44: YES), the routine may proceed to step S45. When it is determined that the layout change instruction has not been received (step S44: NO), the routine may proceed to step S15.

At step S45, the currently-used layout may be changed to another layout based on the layout change instruction received at step S44. More specifically, the currently-used layout may be changed to another layout based on the layout information included in the layout change instruction. Then, the newly-specified layout information, the device ID, and the specified date and time are transmitted to the conference server 2 and the recording server 3. The layout information transmitted at step S45 may represent the layout newly specified at step S44. The device ID may represent the device ID of the communication device 1 that performs the processing of step S44. The specified date and time transmitted at step S44 may represent the date and time at which the layout was changed to the new one at step S44. After step S44, conference data may be generated using the layout represented by the newly-specified layout information.

As depicted in FIG. 15C, processing of step S15 of the conferencing process according to the second illustrative embodiment may be similar to the processing of step S15 of FIG. 6 according to the first illustrative embodiment. Therefore, an explanation will be omitted in the second illustrative embodiment.

Figure 16B:
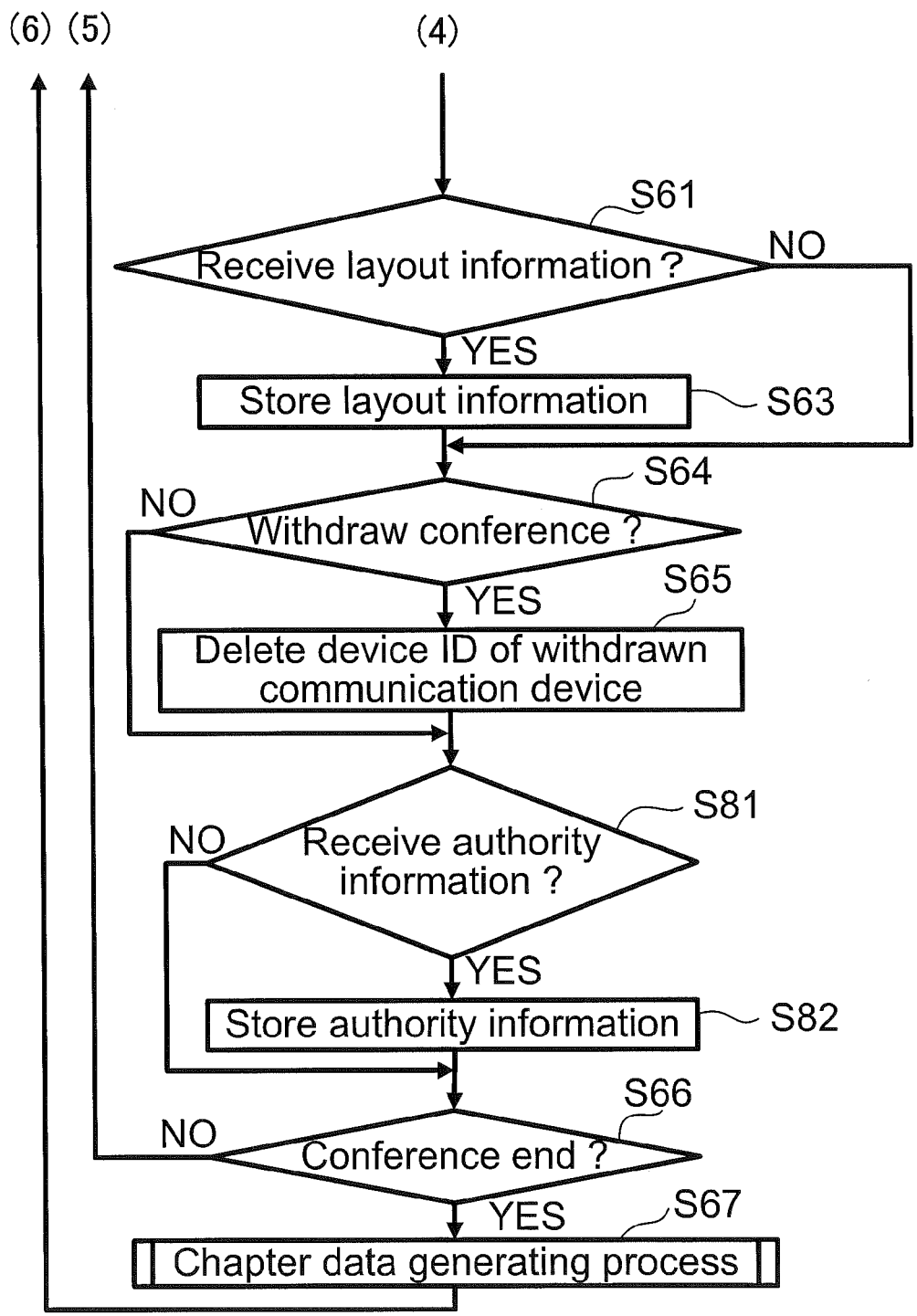

As depicted in FIGS. 16A and 16B, processing of steps S51-S65 of the recording process according to the second illustrative embodiment may be similar to the processing of steps S51-S65 of FIG. 7 according to the first illustrative embodiment. Therefore, an explanation will be omitted in the second illustrative embodiment.

At step S81, whether the authority information has been received from the communication device 1 may be determined. More specifically, it may be determined whether the authority information transmitted from the communication device 1 at step S39 of FIG. 15B has been received. When it is determined that the authority information has been received (step S81: YES), the routine may proceed to step S82. When it is determined that the authority information has not been received (step S81: NO), the routine may proceed to step S66.

At step S82, the authority information received at step S81 may be stored in the list depicted in FIG. 4B in association with the terminal ID. As described above, when the host-authority is transferred to another communication device 1 in the middle of the remote conference, the authority information may be stored in the list at step S82. Therefore, the participant of the remote conference to which the host-authority was transferred in the middle of the remote conference may view the conference proceedings data of the recorded remote conference from the same standpoint as the host of the remote conference.

As depicted in FIG. 16B, processing of steps S66-S67 of the recording process according to the second illustrative embodiment may be similar to the processing of steps S66-S67 of FIG. 7 according to the first illustrative embodiment. Therefore, an explanation will be omitted in the second illustrative embodiment.

The aspects of the disclosure are not limited to the above-described specific embodiments. It would be apparent that various changes and modifications can be made without departing from the scope of the disclosure. In the above-described illustrative embodiments, the conference server 2 and the recording server 3 are individual servers. Nevertheless, in other example embodiments, a single server may function as both of the conference server 2 and the recording server 3. In the above-described illustrative embodiments, the conference data may be generated in the communication device 1. Nevertheless, in other example embodiments, the conference data may be generated in the recording server 3 or the conference server 2. In this case, the conference data may be transmitted from the recording server 3 or the conference server 2 to the communication device 1. Further, the conference data may be provided from the recording server 3 or the conference server 2 to the communication device 1 using a known streaming transmission system. A part of the processing performed by the recording server 3 may be performed by the conference server 2.

In the above-described illustrative embodiments, the recording server 3 receives a conference proceedings request from the communication device 1 and the recording server 3 outputs conference proceedings data to the communication device 1. Nevertheless, in other example embodiments, the recording server 3 may be configured to receive a conference proceedings request from a communication device 1 that is not allowed to perform a remote conference. In this case, the recording server 3 may generate conference proceedings data in accordance with the conference proceedings request and transmit the generated conference proceedings data to the requesting communication device.

What is claimed is:

1. A system comprising:
a recording server; and
a first communication device configured to communicate with the recording server,
wherein the first communication device comprises:
a first processor; and
a first memory configured to store first computer-readable instructions therein that, when executed by the first processor, cause the first communication device to:
receive first media data including at least one of first image data and first audio data from a first image acquiring device and a first audio acquiring device, respectively;
receive second media data including at least one of second image data and second audio data from a second communication device communicating with the first communication device in a conference via a network;
select layout information for controlling a layout of the second image data on a display connected to the first communication device; and
transmit, to the recording server, the first media data, the layout information, and first identification information associated with the first communication device;
wherein the recording server comprises:
a data storage configured to store data;
a second processor; and
a second memory configured to store second computer-readable instructions therein that, when executed by the second processor, cause the recording server to:
receive the first media data from the first communication device;
receive the second media data from the second communication device;
store, in the data storage, the first media data in association with conference identification information, the first identification information associated with the first communication device, and the layout information received from the first communication device;
store, in the data storage, the second media data in association with the conference identification information, second identification information associated with the second communication device, and layout information received from the second communication device;
receive a conference proceedings request comprising identification information associated with at least one of the first communication device and the second communication device;
select a specified layout based on the identification information included within the conference proceedings request; and
generate conference proceedings data by formatting at least one of the first and second media data according to the specified layout.

2. The system according to claim 1,
wherein the transmitting of the first media data, the layout information, and the first identification information comprises transmitting the first media data, the layout information, and the first identification information in association with conference identification information to the recording server,
wherein the conference proceedings request comprises the conference identification information, and
wherein the selecting of the specified layout is further based on the conference identification information included within the conference proceedings request.

3. One or more computer-readable storage media storing computer-executable instructions that, when executed, cause a first communication device to:
receive first media data including at least one of first image data and first audio data from a first image acquiring device and a first audio acquiring device, respectively;
receive second media data including at least one of second image data and second audio data from a second communication device communicating with the first communication device in a conference via a network;
select layout information for controlling a layout of the second image data on a display connected to the first communication device;
transmit, to a recording server, the first media data, the layout information, and identification information associated with the first communication device; and
transmit, to the recording server, update information indicating a change in the layout.

4. The one or more computer-readable storage media of claim 3 storing additional computer-executable instructions that, when executed, cause the first communication device to:
receive, from the recording server, conference proceedings data, which is generated based on the layout information and the second media data.

5. The one or more computer-readable storage media of claim 3 storing additional computer-executable instructions that, when executed, cause the first communication device to:
acquire a timing at which the layout information is selected; and
transmit the timing to the recording server.

6. The one or more computer-readable storage media of claim 3 storing additional computer-executable instructions that, when executed, cause the first communication device to:
detect a change of the layout to an updated layout; and
acquire a timing at which the change is detected,
wherein the update information comprises updated layout information identifying the updated layout and the timing.

7. The one or more computer-readable storage media of claim 3 storing additional computer-executable instructions that, when executed, cause the first communication device to:
transmit a conference request to a conference server; and
receive conference identification information from the conference server,
wherein the transmitting of the first media data, the layout information, and the identification information comprises transmitting the first media data, the layout information, and the identification information in association with the conference identification information to the recording server.

8. The one or more computer-readable storage media of claim 7, wherein the conference identification information comprises at least a portion of a uniform resource locator (URL).

9. The one or more computer-readable storage media of claim 3 storing additional computer-executable instructions that, when executed, cause the first communication device to:
receive a request to change a layout of a display connected to the second communication device to a first layout; and
transmit a layout change instruction to the second communication device to cause the display connected to the second communication device to use the first layout, when the first communication device includes authority information identifying the first communication device as a host device;
receive a second layout change instruction to use a second layout;
change a display connected to the first communication device to use the second layout; and
transmit a layout change notification to the recording server to indicate that the layout has been changed to the second layout.

10. One or more computer-readable storage media storing computer-executable instructions that, when executed, cause a server to:
receive first media data including at least one of first image data and first audio data from a first communication device;
receive second media data including at least one of second image data and second audio data from a second communication device;
store, in a data storage of the server, the first media data in association with conference identification information identifying a conference, first identification information associated with the first communication device, and first layout information of the first communication device;
store, in the data storage, the second media data in association with the conference identification information, second identification information associated with the second communication device, and second layout information of the second communication device;
receive a conference proceedings request comprising identification information associated with at least one of the first communication device and the second communication device;
select a specific layout based on the identification information included within the conference proceedings request; and
generate conference proceedings data by formatting at least one of the first and second media data according to the specific layout.

11. The one or more computer-readable storage media of claim 10 storing additional computer-executable instructions that, when executed, cause the server to:
receive the first layout information controlling a first layout of a first screen on a first display of the first communication device;
store the first layout information in association with the first identification information associated with the first communication device;
receive the second layout information controlling a second layout of a second screen on a second display of the second communication device; and
store the second layout information in association with the second identification information associated with the second communication device.

12. The one or more computer-readable storage media of claim 11 storing additional computer-executable instructions that, when executed, cause the server to:
receive a timing at which the first layout information is selected; and
store, in the data storage area, the timing associated with the first layout information.

13. The one or more computer-readable storage media of claim 10 storing additional computer-executable instructions that, when executed, cause the server to:
determine whether the conference between the first and second communication devices has ended; and
after determining that the conference has ended, organize the first media data and the second media data into chapters based on a timing of a layout change.

14. The one or more computer-readable storage media of claim 10 storing additional computer-executable instructions that, when executed, cause the server to:
determine whether the conference proceedings request is received from a device having authority information indicating that the device is permitted to change a layout,
wherein the selection of the specific layout is made based on a result of the determination.

15. The one or more computer-readable storage media of claim 14 storing additional computer-executable instructions that, when executed, cause the server to:

receive a second conference proceedings request;

determine whether the second conference proceedings request is received from a device having authority information indicating that the device is permitted to change a layout;

in response to determining that the second conference proceedings request is received from the device having the authority information, select a second specific layout according to a layout option included within the second conference proceedings request, the layout option indicating a conference type of the conference; and generate second conference proceedings data by formatting at least one of the first and second media data according to the second specific layout.

16. The one or more computer-readable storage media of claim 10, storing additional computer-executable instructions that, when executed, cause the server to:

receive a second conference proceedings request comprising the conference identification information;

determine whether the second conference proceedings request is from a member of the conference; and select a second specific layout according to conference type of the conference if the second request indicates the conference proceedings request is not from a member of the conference.

17. The one or more computer-readable storage media of claim 10, wherein the selection of the specific layout based on the identification information comprises:

determining the specific layout from layout information, stored in the data storage, based on the identification information, wherein the layout information indicates layouts used by the first and second communication devices during the conference.

18. The one or more computer-readable storage media of claim 3 storing additional computer-executable instructions that, when executed, cause the first communication device to:

determine whether the layout has been changed;

wherein the transmitting of the update information comprises transmitting the update information in a case in which the layout has been changed.

19. The one or more computer-readable storage media of claim 4, wherein the conference proceedings data, received from the recording server, is generated based on the update information transmitted to the recording server.

20. The one or more computer-readable storage media of claim 3, wherein the identification information indicates a user name associated with the first communication device.

21. The one or more computer-readable storage media of claim 10, wherein the selecting of the specified layout comprises selecting a first layout corresponding to the first layout information when the conference proceedings request comprises the identification information associated with the first communication device, or selecting a second layout corresponding to the second layout information when the conference proceedings request comprises the identification information associated with the second communication device.

22. The one or more computer-readable storage media of claim 10, wherein the receiving of the conference proceedings request comprises receiving the identification information indicating a sender of the conference proceedings request.

23. The one or more computer-readable storage media of claim 12, wherein the timing is received from the first communication device and indicates a change in the first layout of the second image data on the first display connected to the first communication device.

* * * * *